(12) United States Patent
Yokoyama et al.

(10) Patent No.: US 11,120,674 B2
(45) Date of Patent: Sep. 14, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Ryo Yokoyama, Tokyo (JP); Osamu Ito, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,889

(22) PCT Filed: Dec. 26, 2018

(86) PCT No.: PCT/JP2018/047703
§ 371 (c)(1),
(2) Date: Jul. 2, 2020

(87) PCT Pub. No.: WO2019/138867
PCT Pub. Date: Jul. 18, 2019

(65) Prior Publication Data
US 2020/0334963 A1 Oct. 22, 2020

(30) Foreign Application Priority Data
Jan. 9, 2018 (JP) .............................. JP2018-001283

(51) Int. Cl.
*H04B 3/36* (2006.01)
*G08B 6/00* (2006.01)
*A63F 13/285* (2014.01)

(52) U.S. Cl.
CPC .............. *G08B 6/00* (2013.01); *A63F 13/285* (2014.09); *A63F 2300/302* (2013.01)

(58) Field of Classification Search
CPC .... G08B 6/00; A63F 13/285; A63F 2300/302; A63F 13/28; G06F 3/01
See application file for complete search history.

(56) References Cited

U.S. PATENT DOCUMENTS

2013/0218456 A1* 8/2013 Zelek ..................... G01C 21/20
   701/412
2016/0317383 A1* 11/2016 Stanfield .............. A61B 5/6804

* cited by examiner

*Primary Examiner* — Toan N Pham
(74) *Attorney, Agent, or Firm* — Paratus Law Group, PLLC

(57) ABSTRACT

There is provided an information processing apparatus, an information processing method, and a program for performing more appropriate haptic presentations. The information processing apparatus includes a signal processing section configured such that in a case where the presentation timing of a first presentation with haptic sensation based on first data overlaps with the presentation timing of a second presentation with either haptic sensation or a sound based on second data, the signal processing section generates a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

15 Claims, 15 Drawing Sheets

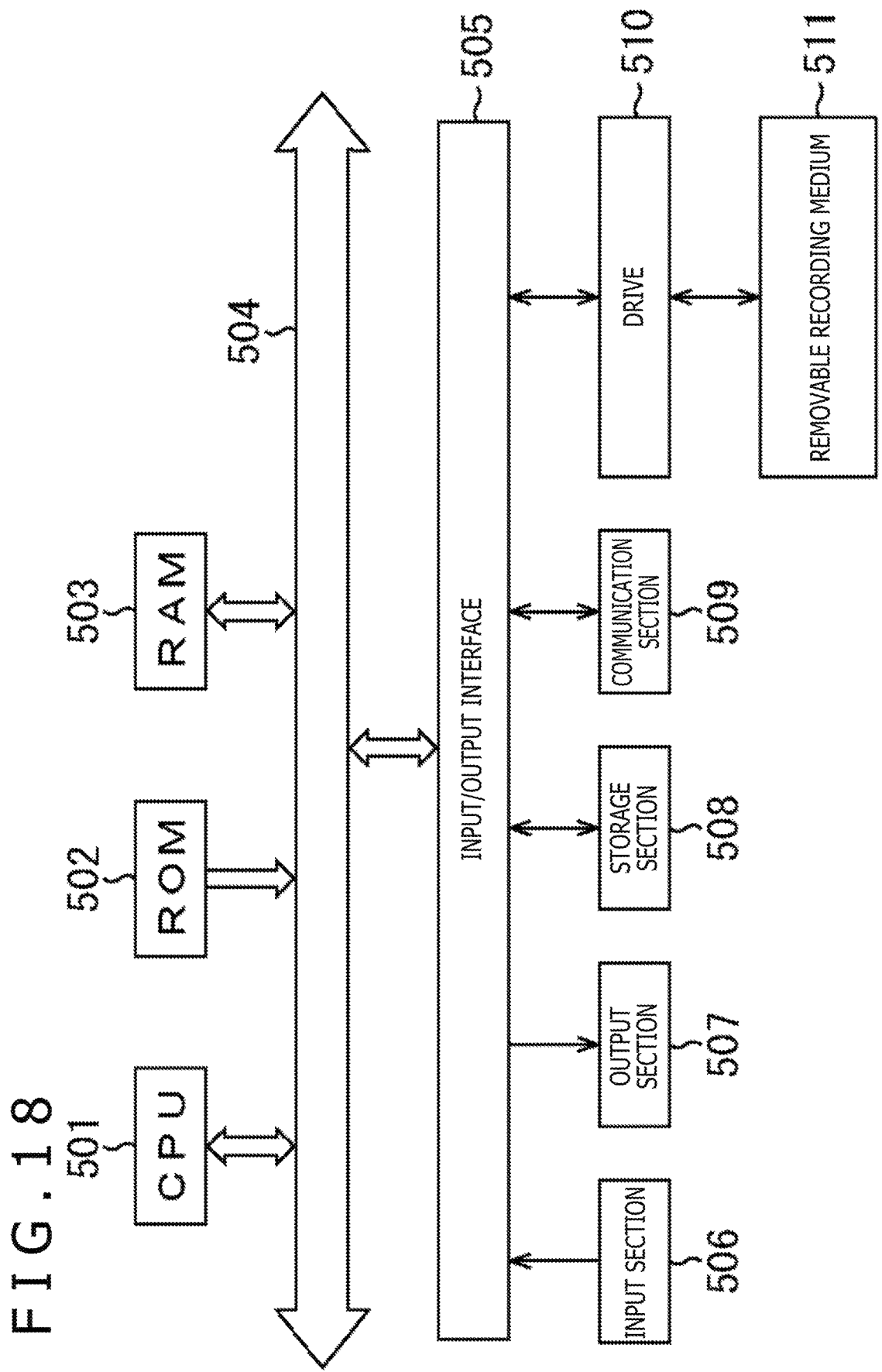

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/047703 (filed on Dec. 26, 2018) under 35 U.S.C. § 371, which claims priority to Japanese Patent Application No. 2018-001283 (filed on Jan. 9, 2018), which are all hereby incorporated by reference in their entirety.

TECHNICAL FIELD

The present technology relates to an information processing apparatus, an information processing method, and a program. More particularly, the technology relates to an information processing apparatus, an information processing method, and a program for providing more appropriate haptic presentations.

BACKGROUND ART

There have been known techniques for providing users with haptic presentations through vibration stimulus, for example, thereby obtaining desired sensory effects. One such technique that has been proposed involves generating a haptic signal for operating a haptic presentation device in response to the contact with a virtual object, for example, so as to implement haptic feedback with more realistic sensations (e.g., see PTL 1).

CITATION LIST

Patent Literature

[PTL 1]
International Unexamined Patent Application Publication No. 2017/043400

SUMMARY

Technical Problem

However, the above-mentioned technique has turned out to be unable to consistently offer appropriate haptic presentations. That is, the technique described in PTL 1 does not take human sensory characteristics into consideration, which has made it difficult to provide suitable haptic presentations in the case where the user is led to perceive two or more sensory effects simultaneously. It has thus been difficult to obtain the sensory effects as intended.

The present technology has been devised in view of the above circumstances and aims to offer more appropriate haptic presentations.

Solution to Problem

According to one aspect of the present technology, there is provided an information processing apparatus including a signal processing section configured such that in a case where a presentation timing of a first presentation with haptic sensation based on first data overlaps with a presentation timing of a second presentation with either haptic sensation or a sound based on second data, the signal processing section generates a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

Also according to one aspect of the present technology, there is provided an information processing method or a program including the step of: in a case where a presentation timing of a first presentation with haptic sensation based on first data overlaps with a presentation timing of a second presentation with either haptic sensation or a sound based on second data, generating a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

Thus according to one aspect of the present technology, in a case where a presentation timing of a first presentation with haptic sensation based on first data overlaps with a presentation timing of a second presentation with either haptic sensation or a sound based on second data, a haptic signal is generated for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

Advantageous Effect of Invention

Thus, according to one aspect of the present technology, it is possible to provide more appropriate haptic presentations.

The advantageous effects stated in this description are only examples and not limitative of the present technology that may also provide other advantages based upon a reading of the description.

BRIEF DESCRIPTION OF DRAWINGS

FIG. 18 is a view depicting a typical configuration of a computer.

DESCRIPTION OF EMBODIMENTS

Some embodiments in which the present technology is implemented are described below with reference to the accompanying drawings.

First Embodiment

<The Present Technology>

The present technology provides more appropriate haptic presentation control by generating a haptic signal for haptic presentation purposes in accordance with sensory characteristics in the case where a plurality of two or more haptic presentations is output to the user at the same time, i.e., where two or more haptic presentations are performed simultaneously. This makes it possible to let the user perceive the sensory effects as intended even when two or more sensory presentations are carried out simultaneously. That is, more appropriate haptic presentations can be made.

Here, haptic presentations involve applying vibration stimulus, temperature stimulus, electrical stimulus, kinesthetic stimulus, or pain stimulus to the skin and muscles of the user's body, for example, thereby enabling the user to perceive predetermined sensory effects via the skin using the haptic sensation of the user's body.

The machines utilizing the haptic sensation come in diverse types, such as controllers, toy guns, beds, vests, or chairs each provided with a haptic presentation device having a haptic feedback function.

In manufacturing such machines, it is desired to design haptic signals for driving various haptic presentation devices and further to do work on designing these haptic signals with intuitive operations. The haptic signals, when designed, are preferably adjusted repeatedly by the designer actually experiencing a bodily sensation of haptic presentations based on the haptic signals.

Meanwhile, there may conceivably be cases where at least two haptic presentations are made at the same time, i.e., where two or more haptic presentations are performed simultaneously.

One such case may be a case where a machine with the haptic feedback function is provided with one haptic presentation device for performing two different haptic presentations simultaneously. In this case, it is conceivable to generate a haptic signal that combines one haptic signal for making one haptic presentation and another haptic signal for carrying out another haptic presentation so that the haptic signal thus obtained will drive one haptic presentation device.

Another case may be where a machine with the haptic feedback function is furnished with a plurality of haptic presentation devices. Some of the plurality of haptic presentation devices may be used selectively to shift the presentation position of haptic presentations.

Figure 1:
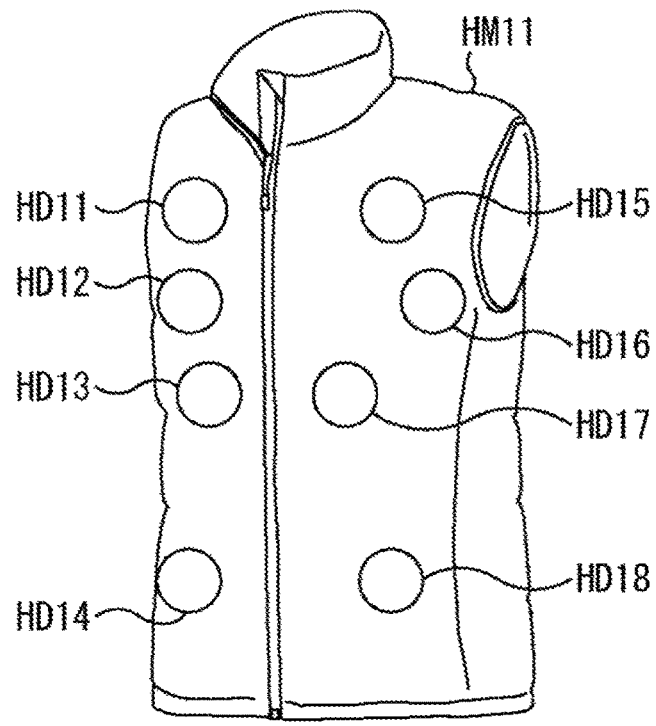
FIG. 1 is a view depicting a typical external configuration of a haptic machine.

Specifically, suppose that a vest-type haptic machine HM11 with the haptic feedback function, such as one depicted in FIG. 1, is provided with 18 haptic presentation devices HDl1 to HD18 for carrying out haptic presentations to the user by resorting to the haptic sensation.

The haptic machine HM11 may be configured, for example, to be a vest-type device capable of haptically presenting, during a battle in a survival game, for example, the direction of a target object and giving feedback such as a hit to the user through haptic presentation.

The haptic machine HMl1 is furnished with the haptic presentation devices HD11 to HD18 for making haptic presentations to the chest part of the user's body using vibrations, for example.

In a case where the haptic presentation devices HD11 to HD18 are each constituted by a piezoelectric element actuator, for example, these devices vibrate when supplied with haptic signals to perform haptic presentations to the user through vibration stimulus.

Figure 2:
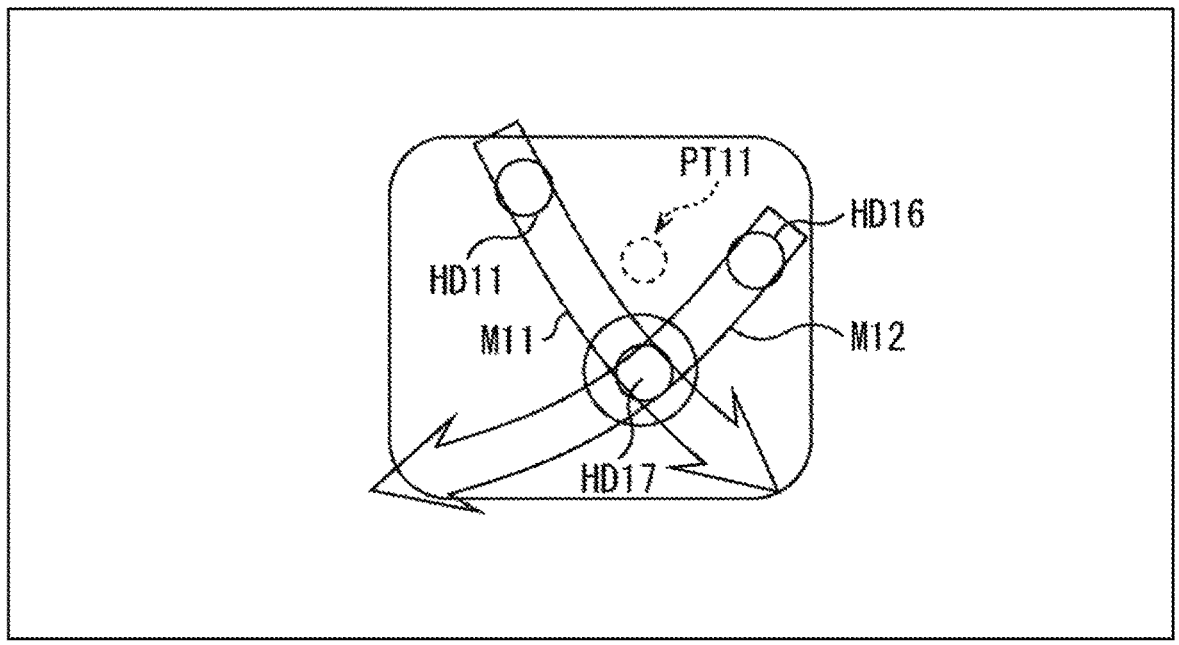
FIG. 2 is a view explaining a haptic presentation.

It is assumed that the haptic machine HM11 first performs a haptic presentation through vibration stimulus by driving the haptic presentation device HD11 and then makes another haptic presentation through vibration stimulus by driving the haptic presentation device HD17, thereby giving a single sensory effect to the user as depicted in FIG. 2, for example. In other words, as indicated by an arrow M11 in FIG. 2, the presentation position where the haptic presentations are made using vibration stimulus is shifted from the top left side to the bottom right side, i.e., the sensory position where the user senses the haptic presentations is shifted. It is to be noted that in FIG. 2, the portions corresponding to those in FIG. 1 are designated by like reference signs, and their explanations are omitted where appropriate.

It is also assumed that apart from the haptic presentation indicated by the arrow M11, another sensory effect is given to the user first by driving the haptic presentation device HD16 for a haptic presentation with vibration stimulus and then by driving the haptic presentation device HD17 for another haptic presentation with vibration stimulus. That is, as indicated by an arrow M12 in FIG. 2, the presentation position where the haptic presentations are made using vibration stimulus is shifted from the top right side to the bottom left side.

It is further assumed that the timing with which the haptic presentation device HD17 is driven to perform the haptic presentation indicated by the arrow M11, i.e., the timing with which the haptic presentation is made using the haptic presentation device HD17, overlaps with the timing with which the haptic presentation device HD17 is driven to carry out the haptic presentation indicated by the arrow M12.

In such a case, two different haptic presentations are made simultaneously at a given timing by the haptic presentation device HD17. In other words, the haptic presentation device HD17 provides the user with one sensory effect obtained by combining (blending) the sensory effects of two different haptic presentations.

Here, the two haptic presentations performed simultaneously by the haptic presentation device HD17 may be of different categories (types) such as vibration stimulus, temperature stimulus, and electrical stimulus.

In the description that follows, the effect obtained by making two or more haptic presentations simultaneously causing the user to sense two or more sensory effects in combination will be specifically referred to as the combined sensory effect.

For example, it has been explained above that the presentation position where two haptic presentations are performed simultaneously at a given timing, i.e., the sensory position, overlaps with the position of the haptic presentation device HD17. Alternatively, the position where these two haptic presentations are carried out simultaneously may be anywhere.

For example, with some of the haptic presentation devices HD11, HD16, and HD17 driven simultaneously, a position PT11 encircled by these devices may be caused to constitute the presentation position where the haptic presentations are made by the haptic presentation devices being driven, i.e., to make up the sensory position. It is thus possible to provide the user with the combined sensory effect at that position PT11 as the sensory position.

For example, it has been further explained that the haptic presentation device HD17 in FIG. 2 simultaneously performs the haptic presentations of the same category. Alternatively, haptic presentations of different categories may conceivably be carried out simultaneously at the same position, such as when a haptic presentation with vibration stimulus and a haptic presentation with temperature stimulus are made simultaneously at the position of the haptic presentation device HD17 as the sensory position.

As described above, in the case where a plurality of two or more haptic presentations is performed at a predetermined position used as the sensory position, it is necessary to carry out haptic presentation control in a manner taking human sensory characteristics into account so as to let humans experience the combined sensory effect at that sensory position as intended.

Thus, according to the present technology, when a plurality of two or more haptic presentations is to be made simultaneously at the same presentation position, the haptic signal to be supplied to the haptic presentation device is generated in consideration of the human sensory characteristics so that more appropriate haptic presentations may be carried out.

That is, in the case where two or more haptic presentations are to be performed simultaneously, the human sensory characteristics are considered so that the sensory effects from these haptic presentations may be effectively combined at the human sensory level and that the user may thereby be given an appropriately combined sensory effect as intended.

<Haptic Presentations of the Same Category>

The present technology is explained below in more detail.

One specific example is explained here, in which a single haptic presentation device performs two haptic presentations of the same category (type) simultaneously.

Here, the presentation position where two haptic presentations are carried out, i.e., the sensory position, is assumed to coincide with the position of the haptic presentation device. However, it is also possible to perform processing similar to the process explained below in cases where the presentation position differs from the position of the haptic presentation device or where the presentation position is shifted over time, with the user allowed to sense the combined sensory effect as intended.

For example, consider generating a haptic signal for causing one haptic presentation device to produce a combined sensory effect that merges two sensory effects through vibration stimulus.

In this case, if a haptic signal for producing one sensory effect and another haptic signal for producing another sensory effect are simply added up and combined (blended) without taking the human sensory characteristics into consideration, a sensory signal obtained from the combining may not allow humans to sense the combined sensory effect as intended. That is because simply combining the haptic signals may not correctly combine the perceptions, i.e., fail to appropriately combine the sensory strengths.

Figure 3:
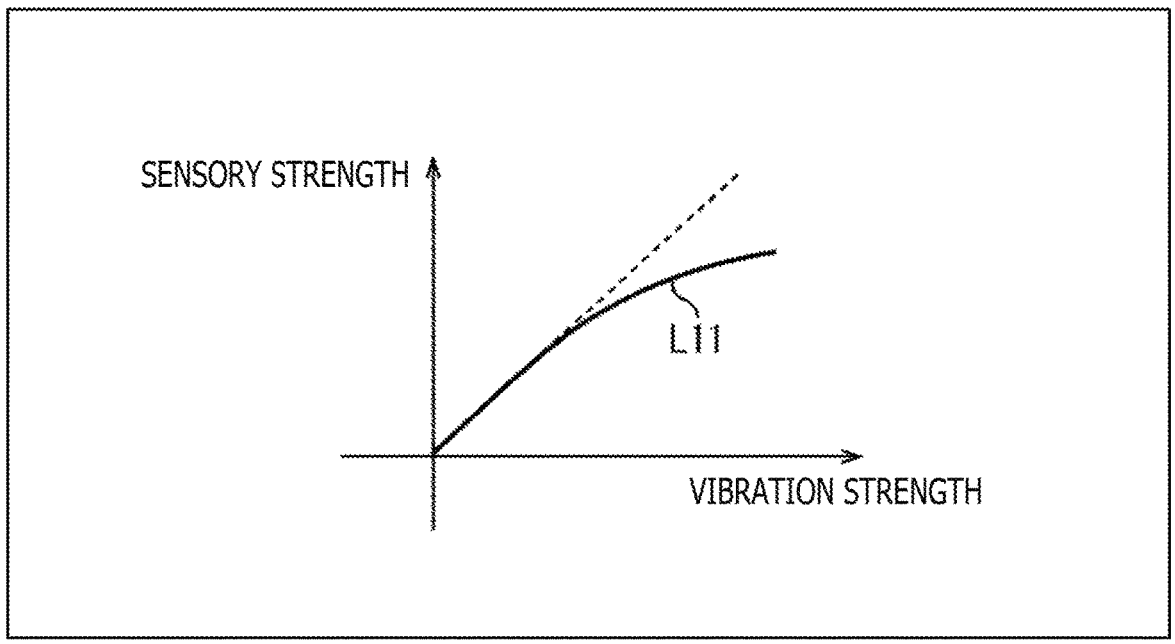
FIG. 3 is a view depicting relations between vibration strength and sensory strength.

For example, as depicted in FIG. 3, human sensory perception occurs nonlinearly with respect to the strength of vibration stimulus, i.e., with regard to the vibration strength that is a physical acceleration value.

It is to be noted that in FIG. 3, the horizontal axis denotes the vibration strength of vibration stimulus, and the vertical axis stands for the strength at which humans sense given vibration stimulus, i.e., the sensory strength.

In this example, a curve line L11 represents the sensory strength of the vibration stimulus given to and sensed by humans. The curve line L11 reveals that humans have the sensory characteristics (sensitivity characteristics) such that the larger the vibration strength, the weaker the sensory perception of vibration stimulus becomes, i.e., humans perceive less vibration stimulus. That is, the sensory perception varies nonlinearly with respect to the vibration strength.

Furthermore, humans have the sensory characteristics (sensitivity characteristics) such that given the vibration stimulus of the same vibration strength, humans still experience different sensory strengths depending on the vibration frequency of the vibration stimulus.

Figure 4:
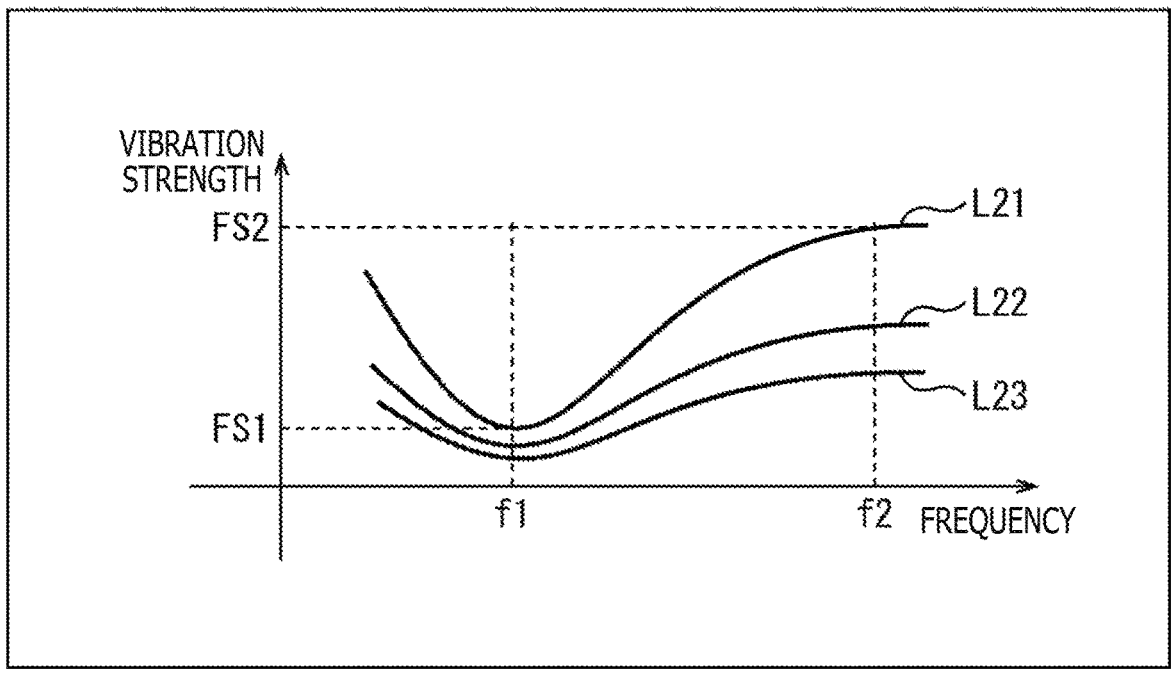
FIG. 4 is a view depicting isosensitivity curve lines.

That is, as depicted in FIG. 4, for example, even when the vibration stimulus of the same sensory strength is given to humans, the necessary vibration strength varies depending on the vibration frequency of the vibration stimulus. In FIG. 4, the horizontal axis stands for vibration frequency and the vertical axis for vibration strength.

In the example depicted in FIG. 4, curve lines L21 to L23 represent relations between the vibration frequencies of the vibration stimulus necessary in the case where the vibration stimuli of predetermined different sensory strengths are given to humans on one hand and vibration strengths on the other hand. That is, the curve lines L21 to L23 denote isosensitivity curves with respect to the predetermined sensory strengths.

It is assumed here that the exemplary sensory strengths represented by the curve lines L21 to L23 are designated by reference signs KS1 to KS3, where KS1>KS2>KS3.

For example, the curve line L21 denotes the vibration strength necessary for giving the stimulus of a predetermined sensory strength KS1 to humans using vibration stimuli at different vibration frequencies.

Specifically, if a vibration strength FS1 is assumed to be in effect at the time the vibration stimulus has a vibration frequency f1, humans sense the vibration stimulus of the sensory strength KS1 from the vibration stimulus. Likewise, if a vibration strength FS2 is assumed to be in effect at the time the vibration stimulus has a vibration frequency f2, humans sense the vibration stimulus of the sensory strength KS1 from the vibration stimulus.

With the curve lines L21 to L23 at different vibration frequencies taken note of, vertical spacing between the curve lines L21 to L23 varies with the different vibration frequencies. From this, it is understood that there are varying degrees at which humans have difficulty in sensing the change in vibration stimulus at different vibration frequencies.

For example, at the vibration frequency f2, there is large spacing between the curve lines L21 through L23 in the direction of vibration strength. It is thus appreciated that at the vibration frequency f2 of the vibration stimulus, the change in sensory strength with respect to the change in the vibration strength of the vibration stimulus is smaller than that in the case of the vibration frequency f1.

Figure 5:
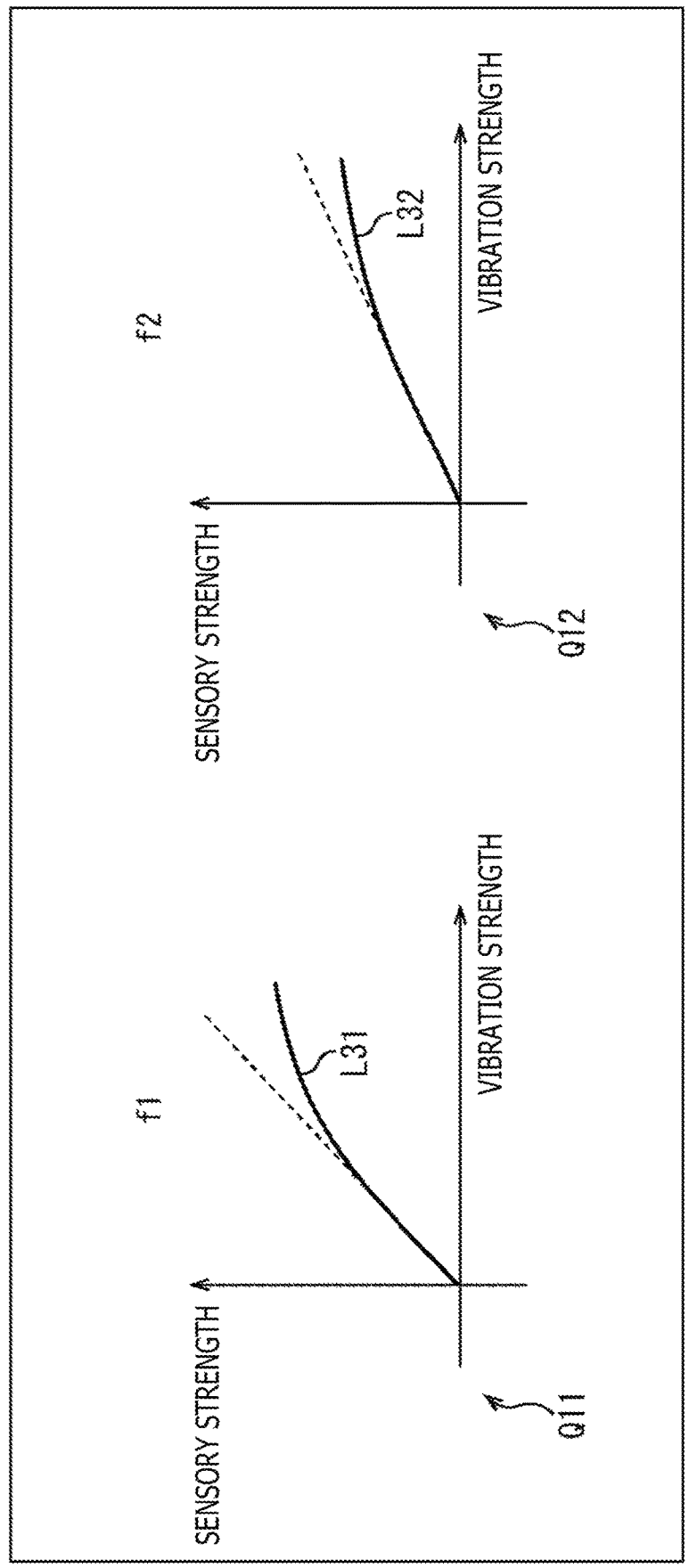
FIG. 5 is a view depicting relations between vibration strength and sensory strength at different vibration frequencies.

In this manner, the amount of change in sensory strength with respect to the change in vibration frequency varies with different vibration frequencies of the vibration stimulus. For example, comparing the vibration frequency f1 with the vibration frequency f2 reveals that the relations between vibration strength and sensory strength are as depicted in FIG. 5. In the example of FIG. 5, the horizontal axis stands for the vibration strength of vibration frequency, and the vertical axis denotes sensory strength with respect to vibration stimulus.

In the example of FIG. 5, a curve line L31 in the part indicated by an arrow Q11 denotes the sensory strength of humans with respect to the vibration stimuli at different vibration strengths in the case where the vibration frequency f1 is in effect. A curve line L32 in the part indicated by an arrow Q12, on the other hand, represents the sensory strength of humans with respect to the vibration stimuli at different vibration strengths in the case where the vibration frequency f2 is in effect.

At the vibration frequency f1, the change in sensory strength occurs linearly at a relatively large gradient with increasing vibration strength, up to a point. Past that point, the amount of change in sensory strength with respect to the change in vibration strength gradually becomes smaller.

At the vibration frequency f2, the change in sensory strength occurs linearly with increasing vibration strength at a smaller gradient than that in the case of the vibration frequency f1, up to a point. Past that point, the amount of change in sensory strength with respect to the change in vibration strength gradually becomes smaller.

As explained above, human sensory perception occurs nonlinearly with respect to vibration strength, and the sensory characteristics of humans vary with different vibration frequencies of vibration stimuli. For this reason, in the case where the haptic presentation is to be made by combining two different vibration stimuli, for example, it is necessary not to simply add up two haptic signals into a final haptic signal but to total the sensory strengths corresponding to the vibration strengths at each of different frequency components, before generating the final haptic signal from the totaled sensory strengths in order to allow humans to sense the combined sensory effect as intended.

Specifically, suppose that with a predetermined vibration frequency taken note of, a haptic presentation based on the haptic signal of a vibration strength A1 and another haptic presentation based on the haptic signal of a vibration strength A2 are carried out simultaneously.

Figure 6:
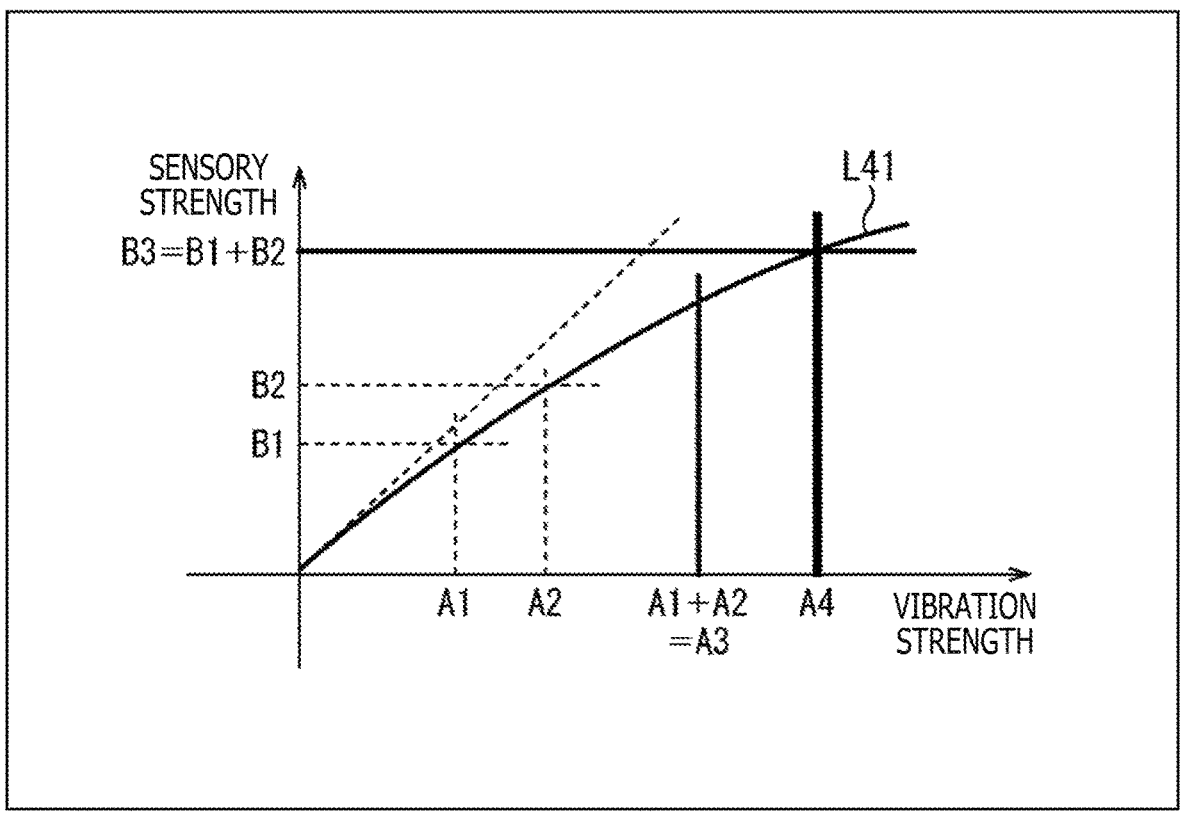
FIG. 6 is a view explaining the combination of haptic signals.

In such a case, at the vibration frequency being noted, humans are assumed to have the sensory characteristics indicated by a curve line L41 in FIG. 6. It is to be noted that in FIG. 6, the horizontal axis stands for vibration strength and the vertical axis denotes sensory strength.

In FIG. 6, the curve line L41 represents the sensory strengths of humans with respect to the vibration strengths at different vibration strengths. In the case where the haptic presentation based on the haptic signal of the vibration strength A1 and the haptic presentation based on the haptic signal of the vibration strength A2 are performed simultaneously, the vibration strengths A1 and A2 are generally added up to obtain a vibration strength A3 (A3=A1+A2) to be represented by the final haptic signal supplied to the haptic presentation device.

However, when the haptic presentation is carried out on the basis of the haptic signal of the vibration strength A3, it is difficult to implement the haptic presentation with a sensory strength that ought to be normally obtained. That is, the combined sensory effect cannot be obtained as intended.

Specifically, in the case where humans have the sensory characteristics indicated by the curve line L41, the sensory strength at the time of making the haptic presentation based on the haptic signal of the vibration strength A1 is one denoted by the reference sign B1. The sensory strength at the time of performing the haptic presentation based on the haptic signal of the vibration strength A2 is one marked by the reference sign B2.

Thus, the sensory strength from making these haptic presentations simultaneously ought to be the sum of the sensory strengths B1 and B2 constituting a sensory strength B3 (B3=B1+B2).

However, making the haptic presentation based on the haptic signal of the vibration strength A3 as the sum of the vibration strengths A1 and A2 provides merely a sensory strength lower (smaller) than the sensory strength B3. An appropriately combined sensory effect cannot be obtained.

According to the present technology, the vibration strengths A1 and A2 are first mapped to sensory strengths on the basis of the sensory characteristics indicated by the curve line L41. The resulting sensory strengths B1 and B2 corresponding to the vibration strengths A1 and A2 are thus obtained.

The sensory strengths B1 and B2 thus obtained are then added up (combined) to acquire the sensory strength B3 for producing the combined sensory effect as intended.

The sensory strength B3 is further mapped to a vibration strength on the basis of the sensory characteristics indicated by the curve line L41. The mapping provides a vibration strength A4 corresponding to the sensory strength B3. A haptic signal of the vibration strength A4 thus obtained is supplied as the final haptic signal to the haptic presentation device.

Making the haptic presentation based on the haptic signal of the vibration strength A4 thus obtained provides the user with the combined haptic effect of the sensory strength B3.

Thus, according to the present technology, when two vibration stimuli with the same sensory strength are simultaneously presented in the form of a haptic presentation, the resulting sensory strength is correctly doubled.

More specifically, a haptic signal is generated for each of different vibration frequencies by the above-described process. The haptic signals at such different vibration frequencies are added up to generate the final haptic signal including a plurality of the vibration frequency components.

Whereas it has been explained that two vibration strengths are combined in the above example, a plurality of three or more vibration strengths is also combined by similar processing. That is, three or more vibration strengths are mapped individually to sensory strengths. These sensory strengths are added up to obtain a sensory strength that is mapped to a vibration strength. A haptic signal is then generated to represent the resulting vibration strength.

As described above, according to the present technology, a plurality of vibration strengths is not simply added up. Instead, these vibration strengths are mapped to sensory strengths that are then added up. The added-up sensory strength is again mapped to a vibration strength of which the appropriate haptic signal is generated.

That is, according to the present technology, in the case where the presentation timings of a plurality of haptic presentations overlap with each other, the haptic signal is generated on the basis of human sensory characteristic data in such a manner that, given the plurality of haptic presentations performed simultaneously, the user experiences a combined sensory effect merging the sensory effects of these haptic presentations. This makes it possible to perform more appropriate haptic presentation control to obtain the combined sensory effect as intended.

It is to be noted that the sensory characteristics of humans vary with different parts of the body such as hands, abdomen, arms, and legs as well as with different ages. Thus, if the haptic signal is generated at each of different vibration frequencies on the basis of the sensory characteristics of different body parts and different ages, the resulting signal takes on a more appropriate form than ever.

Figure 7:
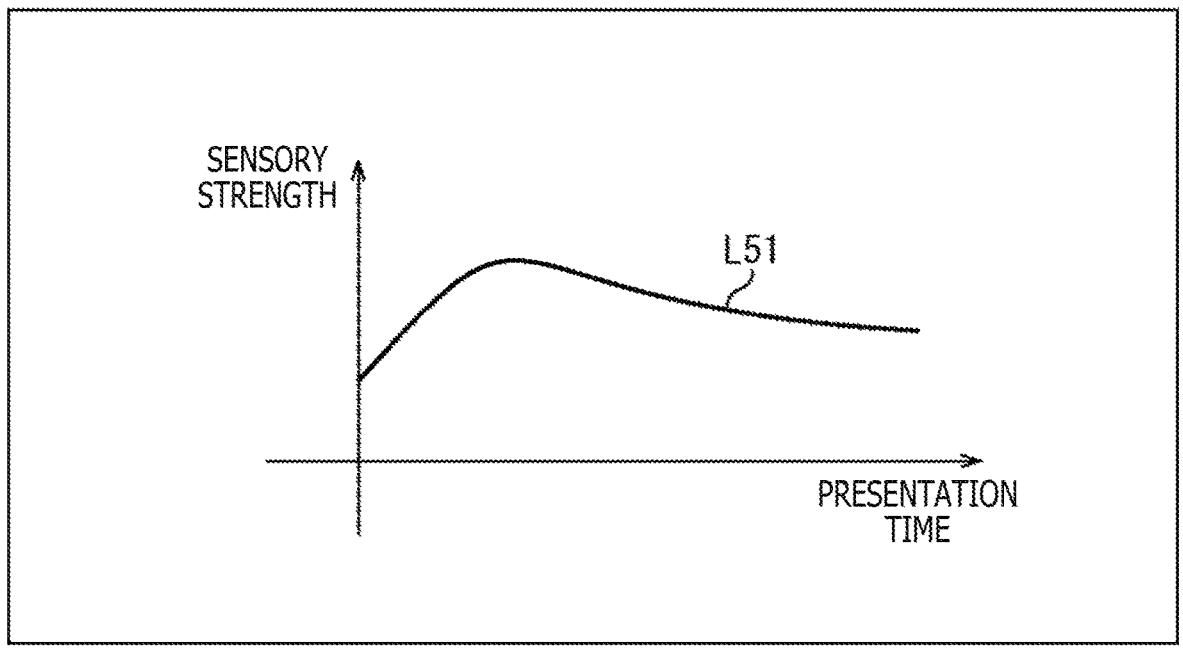
FIG. 7 is a view depicting relations between presentation time and sensory strength.

Furthermore, the sensory perception characteristics of humans with respect to vibration and other stimuli are such that, as depicted in FIG. 7, the perception becomes more sensitive up to a point in time when temporally integrated. Past that point, the perception with respect to the stimuli becomes duller over time.

In FIG. 7, the horizontal axis denotes the presentation time of the haptic presentation with vibration stimulus for example, and the vertical axis represents the sensory strengths of humans with respect to the haptic presentation.

In this example, a curve line L51 indicates the sensory strength with respect to a presentation time during which the haptic presentation of a constant strength is continuously carried out. Given the curve line L51, it is understood that the sensory strength becomes higher the longer the presentation time is so far as the presentation time is shorter than a predetermined time period and that past the predetermined time period, the sensory strength becomes gradually lower the longer the presentation time is.

For example, suppose that the user is given two haptic presentations at different presentation timings in such a manner that the presentation periods of these haptic presentations partially overlap with each other. In this case, the resulting presentation time of the haptic presentations becomes longer than that of each haptic presentation.

As another example, if another haptic presentation is performed continuously following a given haptic presentation, the resulting actual presentation time of these haptic presentations becomes equal to the sum of the presentation times of the individual haptic presentations.

When the presentation periods of a plurality of two or more haptic presentations overlaps with each other partially as described above, the actual presentation time is prolonged. Thus, due to the sensory characteristics of humans with respect to the presentation time illustrated in FIG. 7, the sensory strength can become different from the intended strength.

Figure 8:
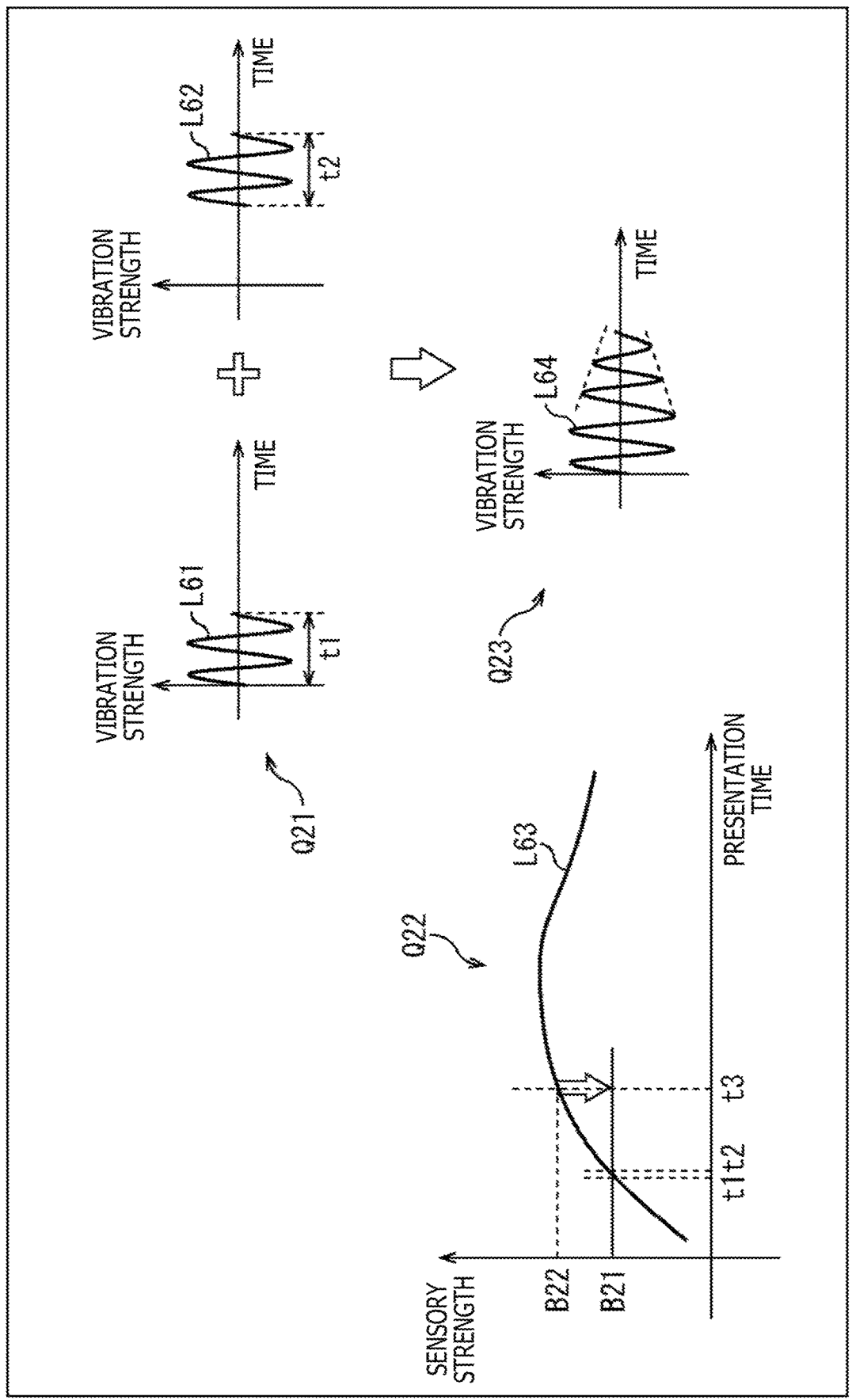
FIG. 8 is a view explaining the adjustment of vibration strength over presentation time.

Specifically, as indicated by an arrow Q21 in FIG. 8, suppose that two haptic presentations are performed, one with vibration stimulus based on a haptic signal of which the waveform is marked by a curve line L61, the other with vibration stimulus based on a haptic signal whose waveform is denoted by a curve line L62. In this case, in the part designated by the arrow Q21, the horizontal axis stands for time, i.e., clock time, and the vertical axis denotes the vibration strength of the haptic presentation.

In this example, a time period t1 starting from a given clock time and during which the haptic presentation based on the haptic signal indicated by the curve line L61 is performed (this haptic presentation may be designated by the reference sign VP1 hereunder) is followed immediately by a time period t2 continued with the haptic presentation VP1 and during which the haptic presentation based on the haptic signal marked by the curve line L62 is carried out (this haptic presentation may be denoted by the reference sign VP2 hereunder).

That is, the presentation end time of the haptic presentation VP1 coincides with the presentation start time of the haptic presentation VP2. This is a state in which the presentation timing of the haptic presentation VP1 partially overlaps with that of the haptic presentation VP2.

Here, the vibration frequency of the haptic presentation VP1 is the same as that of the haptic presentation VP2. Also, the vibration strength of the haptic presentation VP1 is the same as that of the haptic presentation VP2. It follows that carrying out the haptic presentation VP2 continuously with the haptic presentation VP1 is equivalent to performing the haptic presentation at a given vibration frequency for the time period of "t1+t2."

Thus if the user has the sensory characteristics of the sensory strength denoted by a curve line L63 with respect to the presentation time of the haptic presentation with vibration stimulus as marked by an arrow Q22, for example, then it is necessary to adjust the vibration strength of the haptic signal at the time of making the haptic presentations VP1 and VP2.

In the part indicated by the arrow Q22, the horizontal axis denotes the presentation time of the haptic presentation, and the vertical axis represents the sensory strength. It is assumed that a time period t3 stands for the sum of the times t1 and t2.

For example, the time t1 and the time t2 are assumed here to have substantially the same period. Thus, in the case where the haptic presentations VP1 and VP2 are performed individually, the user senses a sensory strength B21 from the presentations.

It follows that when the haptic presentations VP1 and VP2 are carried out continuously one after another, the user ought to continuously sense the sensory strength B21 while the sensory presentation VP2 is being performed.

However, in the case where the user has the sensory characteristics represented by the curve line L63, the user experiences the vibration stimulus of a sensory strength B22 larger than the sensory strength B21 at the point in time at which the haptic presentation VP2 following the haptic presentation VP1 comes to an end, i.e., upon elapse of the time period t3 following the start of the haptic presentation VP1.

Thus according to the present technology, in the case where a plurality of two or more haptic presentations of the same type is performed over a prolonged actual presentation time, the strength of the haptic signal is adjusted (corrected) on the basis of the actual presentation time of the haptic presentations and the user's sensory characteristics with respect to the presentation time.

For example, in the case where the haptic presentations VP1 and VP2 are carried out continuously one after another, the haptic signal is adjusted as indicated by an arrow Q23. In the part marked by the arrow Q23, the horizontal axis stands for time, and the vertical axis denotes the vibration strength (amplitude) of the haptic signal.

A curve line L64 depicted in this example is the waveform of the haptic signal in the case where the haptic presentations VP1 and VP2 are performed continuously one after another.

The haptic signal indicated by the curve line L64 has the same waveform as that of the haptic signal marked by the curve line L61 over the time t1 from the start of the haptic presentation, the vibration strength of the waveform being decreased past the time t1 progressively over time. Here, the decrease rate of vibration strength in the time direction is defined by the sensory characteristics indicated by the curve line L63.

When the haptic presentation is performed on the basis of the haptic signal whose vibration strength is adjusted (corrected) in accordance with the sensory characteristics indicated by the curve line L63, the user is allowed to continuously sense the vibration stimulus of the constant sensory strength B21 following the end of the time t1, from the start to end of the haptic presentation. That is, the combined sensory effect on the user receiving the continuous haptic presentations VP1 and VP2 is rendered in a manner merging the sensory effect of the haptic presentation VP1 with that of the haptic presentation VP2.

<Haptic Presentations of Different Categories>

Explained below is how to control a plurality of haptic presentations of different categories being carried out simultaneously.

For example, in the case where two haptic presentations of different categories are performed to the same presentation position, the sensory strength (sensory effect) of one haptic presentation may be changed under the effect of the other haptic presentation.

Here, consider a specific example in which a haptic presentation with vibration stimulus and a haptic presentation with temperature stimulus are carried out simultaneously to the same presentation position.

Humans have the sensory characteristics such that the higher the temperature of one's skin surface (i.e., body temperature), the more sensitive one's perception becomes with respect to vibration stimulus.

For example, in the case where the user is given a haptic presentation with temperature stimulus, it may be assumed that the skin surface temperature of the user experiencing the haptic presentation with the temperature stimulus to the presentation position (sensory position) is substantially the same as the temperature of the temperature stimulus, i.e., the same as the presentation temperature of the haptic presentation.

For this reason, where a haptic presentation with temperature stimulus is being performed to a predetermined presentation position, making a haptic presentation with vibration stimulus to that presentation position requires adjusting (correcting) the haptic signal of the vibration stimulus in keeping with the temperature of the temperature stimulus in such a manner that the sensory strength on the user with respect to the vibration stimulus is rendered into the initially intended sensory strength.

Specifically, the higher the temperature, the more sensitive the perception of humans becomes with respect to vibration stimulus. Thus, in the case where the temperature of temperature stimulus is higher than a predetermined reference temperature such as humans' average body temperature, the higher the temperature of the temperature stimulus, the lower the vibration strength of the vibration stimulus is only required to be rendered.

Conversely, the lower the temperature, the duller the perception of humans becomes with respect to vibration stimulus. Thus, in the case where the temperature of temperature stimulus is lower than the predetermined reference temperature, the lower the temperature of the temperature stimulus, the higher the vibration strength of the vibration stimulus is only required to be rendered.

Figure 9:
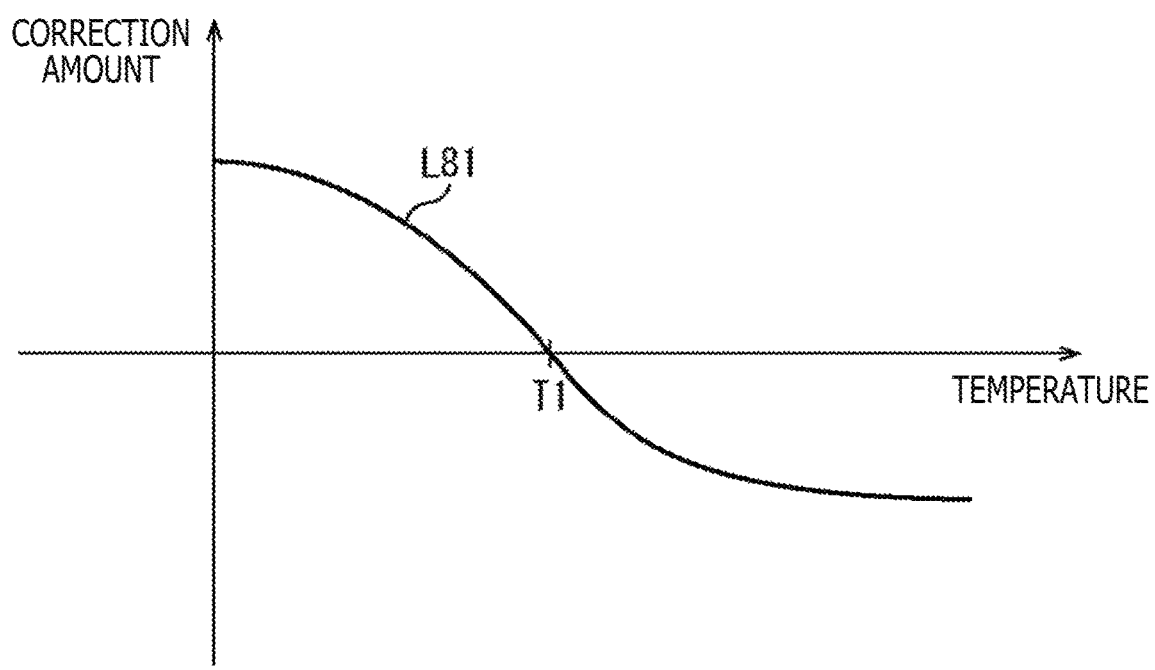
FIG. 9 is a view depicting correction amounts of vibration strength with respect to temperature.

In correcting the vibration strength of the haptic signal of vibration stimulus in keeping with the temperature of temperature stimulus, it is sufficient to prepare in advance the data regarding sensory characteristics as representative of the relations between the strength (temperature) of temperature stimulus at the time of simultaneously performing a haptic presentation with temperature stimulus and a haptic presentation with vibration stimulus on one hand and the sensory strength of humans receiving the vibration stimulus on the other hand. Specifically, there may be prepared beforehand the data indicative of the amount of correction in vibration strength with respect to temperature as depicted in FIG. 9, the data being with respect to the sensory characteristics of the temperature. The data may be used as the basis for correcting the haptic signal.

It is to be noted that in FIG. 9, the horizontal axis denotes the temperature of temperature stimulus, and the vertical axis represents the correction amount of vibration strength. Here, the correction amount may be any value, such as a correction value added to the initial vibration strength for vibration strength correction or a correction coefficient to be multiplied by the initial vibration strength for correction.

In FIG. 9, a curve line L81 denotes the amount of correction in the vibration strength of the haptic signal of vibration stimulus at different temperatures. A temperature T1 is the average human body temperature, such as 36 degrees Celsius.

In this example, the correction amount of vibration strength is negative when the temperature of temperature stimulus is equal to or higher than T1. The higher the temperature, the larger the absolute value of the correction amount is rendered so as to lower the vibration strength progressively.

On the other hand, when the temperature of temperature stimulus is T1 or lower, the correction amount of vibration strength is positive. Thus, the lower the temperature, the larger the absolute value of the correction amount is rendered so as to increase the vibration strength progressively.

The data indicative of such relations between temperature and correction amount may be retained as the data regarding the sensory characteristics with respect to temperature. The data may then be used to provide the intended sensory effect under appropriate haptic presentation control in the case where the haptic presentation with temperature stimulus and the haptic presentation with vibration stimulus are performed simultaneously to the same position.

That is, where the presentation timing of the haptic presentation with vibration stimulus and the presentation timing of the haptic presentation with temperature stimulus overlap with each other at least partially, the combined sensory effect on the user receiving these haptic presentations is rendered in a manner merging the sensory effect of the vibration stimulus with that of the temperature stimulus. In other words, even in the case where vibration stimulus and temperature stimulus are given at the same time, it is possible to keep the sensory strength of the initial vibration stimulus unchanged.

It is to be noted that the sensory characteristics of humans vary with different parts of the body such as hands, abdomen, arms, and legs as well as with different ages. That means more appropriate haptic presentation control can be performed by preparing beforehand the data regarding the sensory characteristics with respect to temperature for each of different body parts and each of different ages.

Also, the amount of change in the sensory strength of vibration stimulus with respect to the change in temperature varies with different vibration frequencies of the vibration strength. Thus, the haptic signal of vibration stimulus may be corrected for each of different vibration frequency components by preparing the data regarding the sensory characteristics with respect to temperature for each different vibration frequency component. Alternatively, there may be provided data regarding the sensory characteristics with respect to temperature for each of different vibration frequencies and for each of different vibration strengths.

For example, the human body has diverse types of receptors for sensing vibration stimulus, such as Meissner's corpuscles, Merkel cells, Ruffini's corpuscles, and Pacini's corpuscles. Each of these receptor types has a different sensitivity to vibration frequency and temperature.

For example, Meissner's corpuscles have the characteristic of sensing vibration stimulus at vibration frequencies ranging from 10 to 200 Hz, of being most sensitive to vibration stimulus at a vibration frequency of approximately 40 Hz, and of being immune to the effect of temperature on the sensitivity to vibration stimulus.

Merkel cells have the characteristic of sensing vibration stimulus at vibration frequencies ranging from 0.4 to 100 Hz, of being most sensitive to vibration stimulus at a vibration frequency of approximately 50 Hz, and of being susceptible to the effect of temperature on the sensitivity to vibration stimulus. Likewise, Ruffini's corpuscles have the characteristic of sensing vibration stimulus at vibration frequencies ranging from 0.4 to 100 Hz, of being most sensitive to vibration stimulus at a vibration frequency of approximately 50 Hz, and of being susceptible to the effect of temperature on the sensitivity to vibration stimulus.

Pacini's corpuscles have the characteristic of sensing vibration stimulus at vibration frequencies ranging from 70 to 1,000 Hz, of being most sensitive to vibration stimulus at a vibration frequency of approximately 250 Hz, and of being susceptible to the effect of temperature on the sensitivity to vibration stimulus.

As described above, diverse factors vary depending on the type of receptors, the factors including the frequency band in which stimulus is sensed, the sensitivity to different vibration frequencies, the presence or absence of the effect of temperature on the sensitivity, and the degree of such effects. Thus, more appropriate haptic presentation control is made possible by preparing beforehand the data regarding the sensory characteristics with respect to temperature as illustrated in FIG. 9 for each of different vibration frequencies at which the haptic presentation with vibration stimulus is carried out.

In this case, given that Meissner's corpuscles are immune to the effect of temperature, for example, the haptic signal for providing vibration stimulus is only required not to be corrected with respect to the vibration stimulus at the vibration frequency of approximately 40 Hz at which Meissner's corpuscles are highly sensitive, in the case where the haptic presentation with temperature stimulus and the haptic presentation with vibration stimulus are simultaneously performed.

In the above example, it has been stated that the haptic signal for haptic presentation is corrected in the case where haptic presentations of two or more different categories are simultaneously carried out. In another example, an audio presentation with auditory sense-based stimulus (signal) may be performed in addition to haptic presentations.

Thus, when presentations of two or more different categories including not only the haptic presentation but also an audio presentation are to be carried out simultaneously, one presentation may be controlled in keeping with another presentation so as to obtain the combined sensory effect as intended.

In one such specific example, a haptic presentation with vibration stimulus and an audio presentation with an audio signal-based sound (audio) may be performed simultaneously.

That is, humans have the sensory characteristics such that, given simultaneously both a haptic presentation with a vibration stimulus having a predetermined frequency characteristic and an audio presentation with a sound having substantially the same frequency characteristic as that of the vibration stimulus, humans have a false sense of perceiving the vibration stimulus more strongly than the actual strength if the loudness of the presented sound is at a predetermined level or higher.

Conversely, humans also have the sensory characteristics such that, given simultaneously both a haptic presentation with a vibration stimulus having a predetermined frequency characteristic and an audio presentation with a sound having substantially the same frequency characteristic as that of the vibration stimulus, humans have a false sense of perceiving the vibration stimulus less strongly than the actual strength if the loudness of the presented sound is at a predetermined level or lower.

Thus, there may be retained, for each of different frequency characteristics, the data indicative of both the level of the sound for the audio presentation and the correction amount of the vibration strength for the vibration stimulus with respect to the level of the sound, the data being related to the sensory characteristics with regard to the sound. The data may then be used as the basis for correcting the haptic signal of the vibration stimulus.

In such a case, the degree of similarity is obtained between the frequency characteristic of the haptic signal for the haptic presentation with the vibration stimulus on one hand and the frequency characteristic of the audio signal for the audio presentation with the sound on the other hand, the two presentations being performed simultaneously. In the case where the degree of similarity thus obtained is equal to or higher than a predetermined value and where the loudness of the sound for the audio presentation is equal to or higher than a predetermined threshold value th1 or is equal to or lower than another predetermined threshold value th2, the vibration strength (amplitude) is corrected on the basis of the data regarding the sensory characteristics with respect to the sound.

For example, in a case where the loudness of the sound for the audio presentation is equal to or higher than the threshold value th1, the amplitude of the haptic signal is corrected in such a manner that the higher the loudness, the lower the vibration strength of the haptic signal is rendered. On the other hand, in a case where the loudness of the sound for the audio presentation is equal to or lower than the threshold value th2, the amplitude of the haptic signal is corrected in such a manner that the lower the loudness, the higher the vibration strength of the haptic signal is rendered.

More specifically, the vibration strength of the haptic signal is corrected for each of different vibration frequency components of the haptic signal. It is to be noted that the threshold values th1 and th2 may be either the same value or different values.

<Data for the Haptic Presentation>

There are diverse methods of retaining the data for haptic and audio presentations. One such method may conceivably involve retaining the haptic and audio signals as content data.

For example, sets of data necessary for performing presentations aimed at producing intended sensory effects, such as the effects of haptic and audio presentations at the time of contact with a hard material like iron, are referred to as the content data.

The content data is assumed to be constituted by one or a plurality of sets of library data. The library data is assumed to be sets of data necessary for performing presentations targeted to produce the intended sensory effect such as those for haptic and audio presentations.

Specifically, two sets of library data may be assumed to make up the content data for carrying out the haptic presentation designed to produce a sensory effect of giving a sense of contact with a hard material.

Here, one set of library data is assumed to be the data for producing a predetermined sensory effect EF1, and the other set of library data is assumed to be the data for producing a sensory effect EF2 different from the sensory effect EF1. In this case, carrying out a haptic presentation based on these two sets of library data produces a combined sensory effect merging the sensory effect EF1 with the sensory effect EF2. The combined sensory effect is an effect that gives a sense of contact with a hard material. It is to be noted, however, that the sensory effects EF1 and EF2 each constitute an effect giving a sense of contact with a hard material as well.

The library data includes haptic data for implementing predetermined haptic presentations and audio data for realizing predetermined audio presentations.

The haptic data includes vibration data with time waveforms at different vibration frequencies for performing haptic presentations using vibration stimulus; temperature data with time waveforms for executing haptic presentations using temperature stimulus; and time-series data for conducting haptic presentations using kinesthetic stimulus such as force data. The audio data is the data of sounds with time waveforms for carrying out haptic presentations using sounds. For example, one set of vibration data at a predetermined vibration frequency for performing a haptic presentation with vibration stimulus constitutes a signal with a time waveform such as one indicated by the curve line L61 or L62 in FIG. 8.

In the above example, it has been stated that the haptic data constitutes time-waveform data, i.e., digital signals. Alternatively, the haptic data may be any data as long as the data provides haptic signals. For example, the vibration data as the haptic data may constitute data representative of presentation times, vibration strengths, and vibration frequencies.

As another example, preparing a plurality of sets of library data beforehand allows content data builders to combine desired sets of library data so as to merge a plurality of sensory effects into the intended sensory effect.

At the time of reproducing content data, the haptic data and audio data included in one or a plurality of sets of library data found in the content data of interest are combined for each of different categories and for each of different vibration frequencies. This generates the haptic signal to be supplied to a haptic presentation device and the audio signal to be sent to an audio presentation device that provides audio presentations.

Likewise, when a plurality of sets of content data is simultaneously reproduced, the haptic data and audio data included in the library data of the content data are combined for each of different categories and for each of different vibration frequencies to generate the final haptic signal and audio signal.

In particular, when sets of haptic data are combined, the combining takes place in a region of sensory strengths such as one depicted in FIG. 6. The obtained sensory strength is mapped to a vibration strength. The amplitude of the haptic data (i.e., vibration strength) is adjusted in such a manner as to render the haptic data into a haptic signal with its vibration strength equivalent to the vibration strength obtained from the mapping.

In the case where combining sets of haptic data results in a haptic presentation over a presentation time longer than the individual presentation times of the yet-to-be-combined sets of haptic data, the vibration strength of the haptic data is adjusted on the basis of the sensory characteristics with respect to presentation time as explained above with reference to FIG. 8, for example.

As another example, where a plurality of sets of temperature data as haptic data is combined, an average temperature value sensed by the user on the basis of these sets of temperature data is regarded as the temperature for temperature stimulus based on the ultimately obtained haptic signal.

As a further example, where a plurality of sets of force data is combined as haptic data, an average is obtained of vectors indicative of the force sensed by the user on the basis of these sets of force data. The force denoted by the average vector is regarded as the force of kinesthetic stimulus based on the ultimately obtained haptic signal.

That is, at the time of combining sets of haptic data, the haptic signal is generated by combining the sensory strengths of vibration, the actually sensed temperature and force levels, and other factors on the sensory level.

Further, in the case of simultaneously performing a specific combination of presentations in different categories, such as the combination of a haptic presentation with vibration frequency and a haptic presentation with temperature stimulus or the combination of a haptic presentation with vibration stimulus and a haptic presentation with a sound, the haptic signal is corrected on the basis of the data regarding the sensory characteristics as explained above with reference to FIG. 9.

As another example, each set of library data may be provided with parameters representing the amplitudes of haptic data and audio data. Then, the user may designate the value of each of the parameters in order to adjust the vibration strengths, temperatures, levels of force and sounds, and presentation times.

<Typical Configuration of the Information Processing Apparatus>

Figure 10:
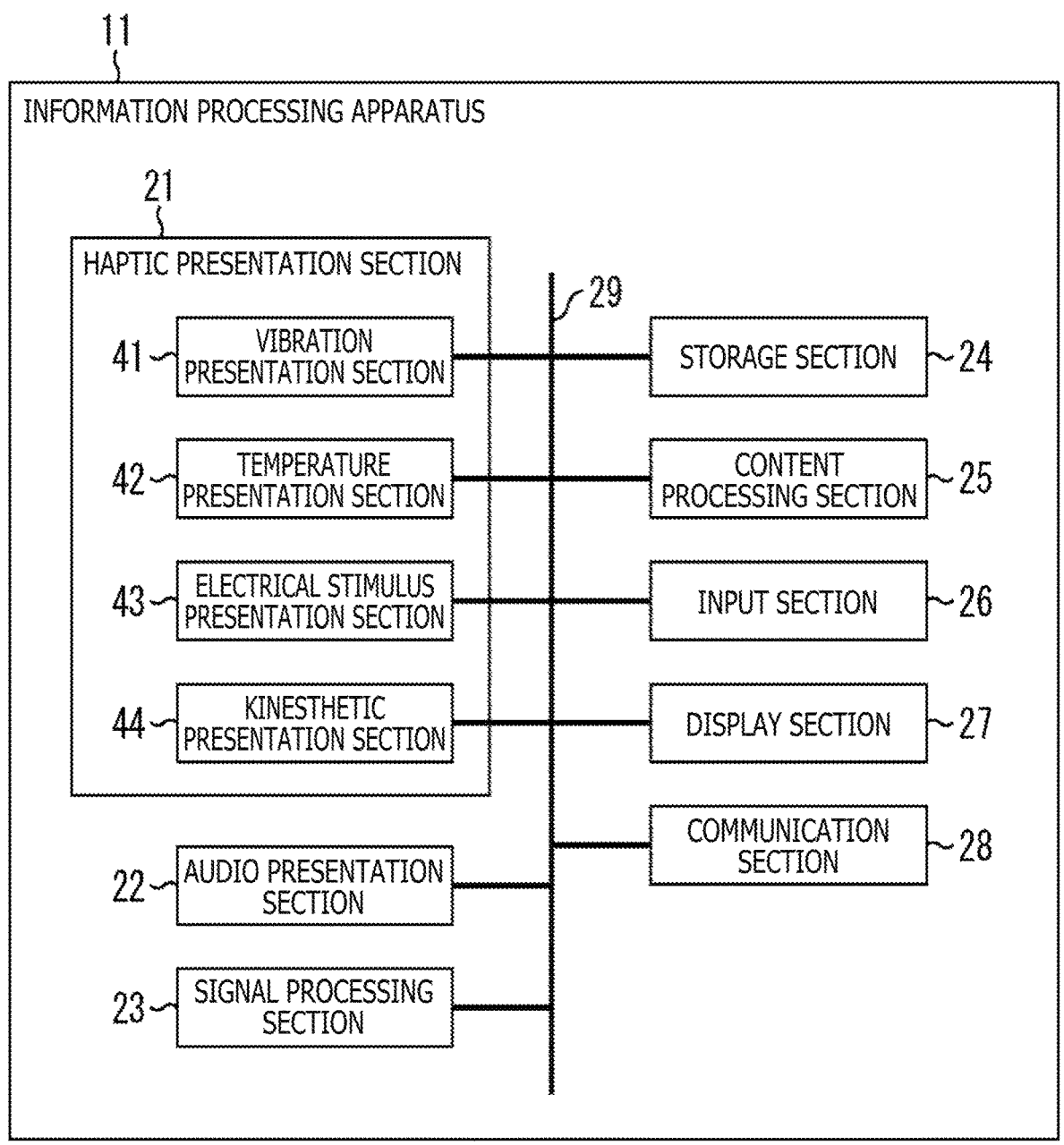
FIG. 10 is a view depicting a typical configuration of an information processing apparatus.

Explained below is an embodiment of the above-described technology being applied to an information processing apparatus. FIG. 10 is a view depicting a typical configuration of an information processing apparatus to which the present technology is applied.

An information processing apparatus 11 depicted in FIG. 10 corresponds, for example, to the vest-type (jacket-type) haptic machine HM11 illustrated in FIG. 1. It is to be noted that the information processing apparatus 11 is not limited to the haptic machine HM11. The information processing apparatus 11 may obviously be any one of other suitable devices or apparatuses, including wearable devices such as head-mounted displays, mobile terminals such as smartphones and tablets, game controllers, belt-type or wristband-type haptic machines, and portable devices such as game consoles.

The information processing apparatus 11 includes a haptic presentation section 21, an audio presentation section 22, a signal processing section 23, a storage section 24, a content processing section 25, an input section 26, a display section 27, and a communication section 28. These component blocks ranging from the haptic presentation section 21 to the communication section 28 are interconnected via a bus 29. Some of the blocks ranging from the haptic presentation section 21 to the communication section 28 may be interconnected by dedicated signal lines different from the bus 29.

The haptic presentation section 21 provides the user holding or wearing the information processing apparatus 11 with haptic presentations using vibration stimulus or temperature stimulus.

The haptic presentation section 21 includes a vibration presentation section 41, a temperature presentation section 42, an electrical stimulus presentation section 43, and a kinesthetic presentation section 44.

The vibration presentation section 41 includes, for example, a piezo element actuator, a piezoelectric actuator, an LRA (Linear Resonant Actuator), a voice coil motor, or an eccentric motor. The vibration presentation section 41 vibrates when supplied with the haptic signal from the signal processing section 23 via the bus 29, thereby performing a haptic presentation with vibration stimulus, i.e., a vibration presentation, to the user.

The temperature presentation section 42 includes a Peltier element, for example. The temperature presentation section 42 is driven by the haptic signal supplied from the signal processing section 23 via the bus 29, thereby performing a haptic presentation with temperature stimulus, i.e., a temperature presentation, to the user.

The electrical stimulus presentation section 43 includes an electrode pad, for example. The electrical stimulus presentation section 43 generates an electric current when supplied with the haptic signal supplied from the signal processing section 23 via the bus 29, thereby performing a haptic presentation with electrical stimulus to the user.

The kinesthetic presentation section 44 includes an electrode pad, for example. The kinesthetic presentation section 44 is driven by the haptic signal supplied from the signal processing section 23 via the bus 29, to stimulate the user in a manner evoking the haptic effect by magnetic force. This provides the user with the haptic presentation based on kinesthetic stimulus.

The sections ranging from the vibration presentation section 41 to the kinesthetic presentation section 44 are haptic presentation devices that carry out haptic presentations using vibration stimulus and temperature stimulus, among others.

In the above example, it has been stated that there is only one vibration presentation section 41. Alternatively, there may be provided two or more vibration presentation sections 41. Likewise, each of the sections ranging from the temperature presentation section 42 to the kinesthetic presentation section 44 may be provided in plural numbers. Further, the haptic presentation section 21 may be furnished with a pain stimulation section constituted by a haptic presentation device that performs haptic presentations using pain stimulus.

The audio presentation section 22 includes speakers, for example. The audio presentation section 22 outputs sounds when supplied with the audio signal from the signal processing section 23 via the bus 29, thereby performing an audio presentation to the user. The audio presentation section 22 may alternatively be provided in a plurality of numbers.

The signal processing section 23 generates a haptic signal and an audio signal on the basis of the haptic data and audio data supplied from the content processing section 25 via the bus 29. The signal processing section 23 outputs the haptic signal and audio signal thus obtained onto the bus 29. The haptic signal output onto the bus 29 is supplied to the vibration presentation section 41, the temperature presentation section 42, the electrical stimulus presentation section 43, and the kinesthetic presentation section 44. The audio signal output onto the bus 29 is sent to the audio presentation section 22.

The signal processing section 23 supplies the haptic signal and audio signal to the haptic presentation section 21 and the audio presentation section 22 to drive these two sections, i.e., to control driving of these sections. In that sense, the haptic signal and audio signal may be said to be the signals for controlling the haptic presentation section 21 and the audio presentation section 22.

At the timing of generating the haptic signal, the signal processing section 23 may, as needed, combine the sensory strengths as explained with reference to FIG. 6, adjust the vibration strength as explained with reference to FIG. 8, and correct the haptic signal on the basis of the data regarding the sensory characteristics as explained with reference to FIG. 9, for example.

Furthermore, the signal processing section 23 carries out other processes such as the process of supplying predetermined images to the display section 27 for display in accordance with instructions supplied from the input section 26.

The storage section 24 includes a nonvolatile memory, for example. The storage section 24 stores the content data and the sensory characteristic data as the data regarding diverse sensory characteristics.

For example, the storage section 24 stores data indicative of the vibration strengths at different vibration frequencies as depicted in FIG. 6, data indicative of the haptic strengths with respect to presentation times at different vibration frequencies as illustrated in FIG. 8, and data indicative of the correction amounts with regard to temperatures at different frequencies as indicated in FIG. 9, the stored data being the sensory characteristic data regarding the haptic sensation with respect to each of different ages and each of different body parts of the user.

The content processing section 25 reads out content data from the storage section 24 via the bus 29 in response to instructions supplied from the input section 26, for example. The content processing section 25 then supplies the haptic data and audio data included in the retrieved content data to the signal processing section 23 via the bus 29.

The input section 26 includes buttons, switches, and/or a touch panel, for example. The input section 26 supplies the signal reflecting the user's operation, i.e., the instruction input from the user, to the content processing section 25 and to the signal processing section 23 via the bus 29.

The display section 27 includes a liquid crystal display panel or an organic EL (Electro Luminescence) panel, for example. The display section 27 displays images supplied from the signal processing section 23 via the bus 29. The communication section 28 communicates by wire or wirelessly with external servers or with other information processing apparatuses. By so doing, the communication section 28 transmits the data from the signal processing section 23 to the outside or supplies the signal processing section 23 with the data received from the outside.

Preferably, some components of the configuration, such as the input section 26, the display section 27, and the communication section 28, may not be included in the information processing apparatus 11.

<Explanation of the Presentation Process>

The operation of the information processing apparatus 11 is explained next.

That is, the presentation process performed by the information processing apparatus 11 is explained below with reference to the flowchart of FIG. 11. The presentation process is carried out when the content processing section 25 is instructed to reproduce the designated one or a plurality of sets of content data.

In step S11, the content processing section 25 reads the content data designated to be reproduced from the storage section 24 via the bus 29, supplies the retrieved content data to the signal processing section 23, and instructs the signal processing section 23 to reproduce the designated sets of content data. At this point, the content processing section 25 also provides the signal processing section 23 with the presentation timing of the library data included in each set of content data.

In step S12, the signal processing section 23 determines whether or not there is any specific combination of haptic and audio data that are included in the content data designated to be reproduced and which have their presentation timings overlap with each other.

For example, in the case where the time periods of haptic presentations involving two sets of haptic data with vibration stimulus at the same vibration frequency overlap with each other at least partially, or where the time period of a haptic presentation with vibration stimulus and the time period of a haptic presentation with temperature stimulus overlap with each other at least partially, it is determined that there exist sets of data of which the presentation timings overlap with each other.

In the case where it is determined in step S12 that there are no sets of data of which the presentation timings overlap with each other, control is transferred to step S13.

In step S13, the signal processing section 23 performs the presentations that produce the effects reflecting the content data.

That is, the signal processing section 23 generates the haptic and audio signals based on the haptic and audio data included in the content data supplied from the content processing section 25.

For example, the signal processing section 23 adds up the vibration data at different vibration frequencies as the haptic data and uses the resulting one set of vibration data as the haptic signal for a haptic presentation with vibration stimulus. At this point, there are no signals of which the presentation timings overlap with each other, so that the combining of sensory strengths explained with reference to FIG. 6 or the correction (adjustment) of the haptic signal explained with reference to FIGS. 8 and 9 is not carried out.

After generating the haptic and audio signals, the signal processing section 23 supplies the generated haptic signal of each of different categories to the vibration presentation section 41, the temperature presentation section 42, the electrical stimulus presentation section 43, and the kinesthetic presentation section 44 corresponding to the respective categories. At the same time, the signal processing section 23 supplies the generated audio signal to the audio presentation section 22.

When supplied with the haptic signals, the vibration presentation section 41, the temperature presentation section 42, the electrical stimulus presentation section 43, and the kinesthetic presentation section 44 perform the haptic presentations based on the supplied haptic signals. Likewise, when supplied with the audio signal, the audio presentation section 22 performs the audio presentation based on the supplied audio signal.

After the haptic presentations and the audio presentation are carried out in this manner, the presentation process is terminated.

On the other hand, in the case where it is determined in step S12 that there exist sets of data of which the presentation timings overlap with each other, control is transferred to step S14. In the subsequent steps S14 through S16, the signal processing section 23 generates the haptic and/or the audio signal in a manner reflecting whether or not two or more presentations whose presentation periods overlap with each other belong to the same category. Presentations are then carried out on the basis of the signals thus generated.

In step S14, the signal processing section 23 determines whether or not the sets of data whose presentation timings overlap with each other belong to the same category.

It is determined in step S14 that the sets of data belong to the same category in the case where, for example, the presentation timings of two sets of haptic data involving vibration stimulus at the same vibration frequency overlap with each other.

In the case where it is determined in step S14 that the sets of data belong to the same category, step S15 is reached. In step S15, the information processing apparatus 11 performs a same-category combining process. The information processing apparatus 11 generates the signal by combining the sets of data that belong to the same category and of which the presentation timings overlap with each other, and performs the presentation accordingly. Upon completion of the same-category combining process, the presentation process is terminated. The same-category combining process will be discussed later in detail.

On the other hand, in the case where it is determined that the sets of data of which the presentation timings overlap with each other do not belong to the same category in step S14, control is transferred to step S16. In this case, the sets of data whose presentation timings overlap with each other are constituted either by haptic data of different categories or by haptic data and audio data.

In step S16, the information processing apparatus 11 performs a strength adjusting process to adjust the strength of at least one of the sets of data of which the presentation timings overlap with each other. The information processing apparatus 11 then performs haptic and audio presentations based on the haptic and audio signals ultimately obtained from the adjusting. Upon completion of the strength adjusting process, the presentation process is terminated. The strength adjusting process will be discussed later in detail.

In the manner described above, the information processing apparatus 11 reproduces the designated content data and thereby performs haptic and audio presentations.

<Explanation of the Same-Category Combining Process>

Figure 11:
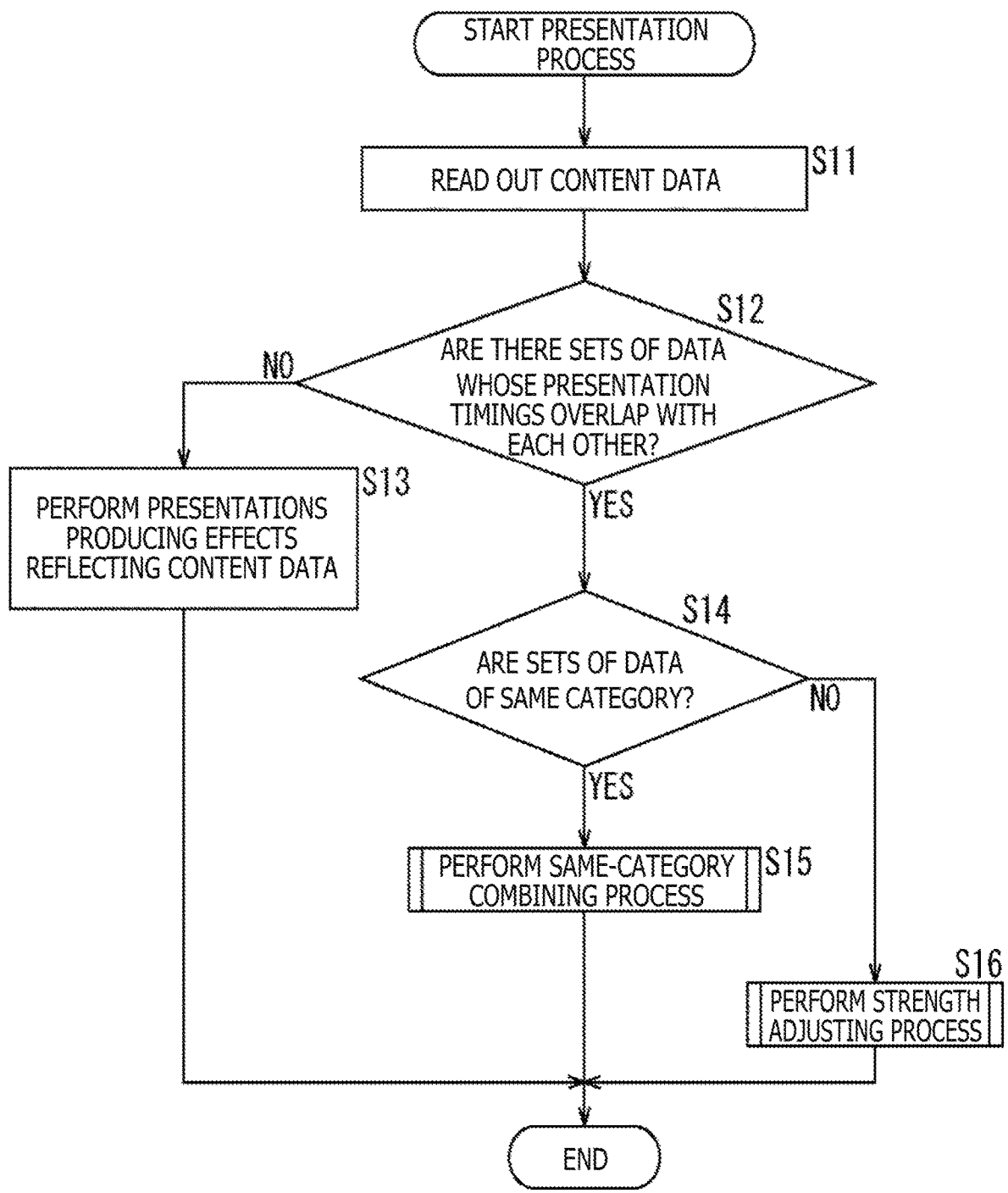
FIG. 11 is a flowchart explaining a presentation process.
Figure 12:
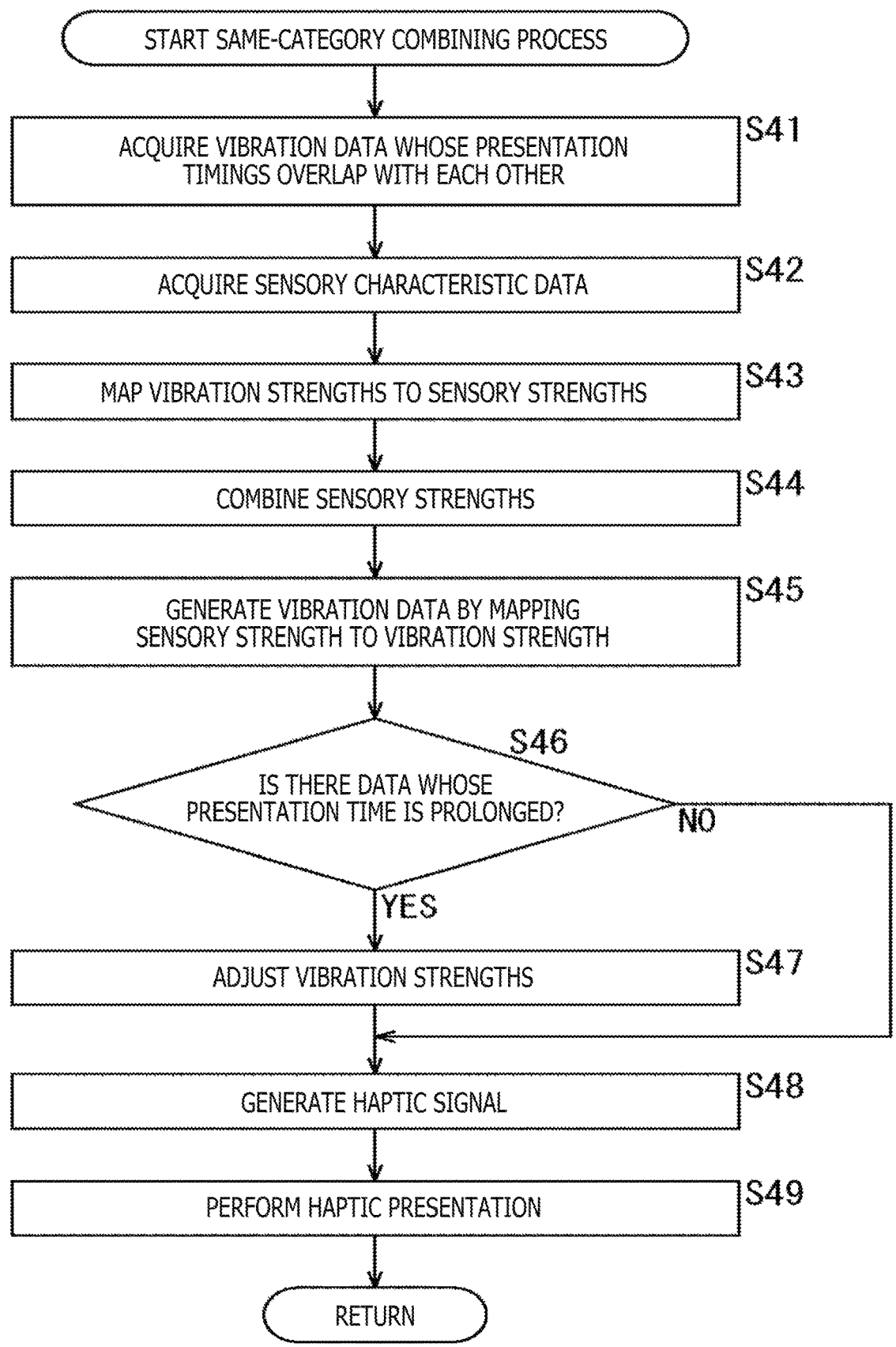
FIG. 12 is a flowchart explaining a same-category combining process.

Explained below with reference to the flowchart of FIG. 12 is the same-category combining process corresponding to the processing of step S15 in FIG. 11. For the purpose of giving explanation specifically, the example to be explained hereunder involves two sets of vibration data as the haptic data of which the presentation timings overlap with each other.

In step S41, the signal processing section 23 acquires (extracts) sets of vibration data as the haptic data with overlapping presentation timings at different vibration frequencies out of the content data (library data) supplied from the content processing section 25.

In the case where one set of vibration data includes a plurality of frequency components, the signal processing section 23 performs factorization such as frequency conversion on the vibration data so as to extract data regarding each of different frequency components from the vibration data.

In step S42, the signal processing section 23 acquires from the storage section 24 the sensory characteristic data indicative of the sensory strength with respect to vibration strength as depicted in FIG. 6, for example, for the vibration frequency of the vibration data obtained in step S41. The sensory characteristic data indicate the relations between the vibration strength of the vibration stimulus at the time of the haptic presentation with vibration stimulus (haptic sensation), i.e., the strength of the haptic presentation on one hand, and the sensory strength on the user on the other hand.

In the case where the user's age and the user's body part corresponding to the presentation position of the haptic presentation with vibration stimulus can be identified by the signal supplied from the input section 26, for example, the signal processing section 23 acquires, for each of different vibration frequencies, the sensory characteristic data indicative of the sensory strength with respect to the vibration strength, the data being prepared for each of the ages and body parts identified of the user.

In step S43, the signal processing section 23 maps (converts), at each of different vibration frequencies, the vibration strength indicated by each set of vibration data (haptic data) acquired in step S41, to a sensory strength.

In step S44, the signal processing section 23 combines the sensory strengths obtained from different sets of vibration data at different vibration frequencies in step S43. For example, a single sensory strength is obtained by adding up the sensory strengths thus acquired. That is, the sum of the sensory strengths is regarded as the combined sensory strength.

In step S45, the signal processing section 23 maps (converts), at each vibration frequency, the combined sensory strength obtained in step S44 to a vibration strength on the basis of the sensory characteristic data acquired in step S42, thereby generating vibration data. That is, the signal of the vibration strength obtained by mapping is regarded as the final vibration data (haptic data) acquired by the combining. This is how to obtain the vibration data for performing the haptic presentation with a strength such as to cause the combined sensory strength to be sensed.

More specifically, the above-described processing ranging from step S41 to step S45 takes place only over a segment in which the presenting timings of two sets of vibration data overlap with each other. In steps S41 through S45, the processing described with reference to FIG. 6, for example, is carried out to obtain the haptic data at each of different vibration frequencies for producing the combined sensory effect as intended.

In step S46, the signal processing section 23 determines whether or not there exist any data at all vibration frequencies of which the presentation time of the vibration stimulus based on the vibration data is prolonged.

For example, in the case where the presentation periods of two sets of vibration data at the same vibration frequency overlap with each other partially or totally, such as where two sets of vibration data at the same vibration frequency are reproduced in a temporally continuous manner, it is determined that the presentation time is prolonged.

In the case where it is determined in step S46 that there is no data whose presentation time is prolonged, the processing in step S47 is not performed. Control is then transferred to step S48.

On the other hand, in the case where it is determined in step S46 that there exists data whose presentation time is prolonged, the signal processing section 23 acquires, for the vibration frequency at which the presentation time is prolonged, the sensory characteristic data indicative of the sensory strength with respect to presentation time as depicted in FIG. 8, for example, from the storage section 24. Control is then transferred to step S47. The acquired sensory characteristic data constitute data indicative of the relations between the presentation time at the time of performing the haptic presentation with vibration stimulus on one hand and the sensory strength on the user on the other hand.

In the case where the user's age and the user's body part corresponding to the presentation position of the haptic presentation with vibration stimulus can be identified by the signal supplied from the input section 26, for example, the signal processing section 23 acquires, for each of different vibration frequencies at which the presentation time is prolonged, the sensory characteristic data indicative of the sensory strengths with respect to presentation time and prepared for each of the ages and body parts identified of the user.

In step S47, the signal processing section 23 adjusts the vibration strength of the vibration data with the vibration frequency at which the presentation time is prolonged on the basis of the sensory characteristic data indicative of the sensory strength with respect to presentation time and acquired from the storage section 24.

Here, the vibration strength at each of different clock times of the vibration data is adjusted (corrected) in keeping with the presentation time as explained with reference to FIG. 8, for example.

Incidentally, the processing of step S47 may be performed either before or after the processing ranging from step S43 to step S45. More specifically, in the case where two sets of vibration data at the same vibration frequency is reproduced in a temporally continuous manner, the processing of steps S42 to S45 is not performed, and solely the processing of step S47 is carried out.

In the case where the processing of step S47 is performed or where it is determined in step S46 that there is no data whose presentation time is prolonged, step S48 is reached and the processing thereof is carried out.

In step S48, the signal processing section 23 combines the sets of vibration data at all vibration frequencies, including the vibration data at each of different vibration frequencies obtained in step S45 and the vibration data of which the vibration strength is adjusted in step S47. By so doing, the signal processing section 23 generates a haptic signal for vibration stimulus including these vibration frequency components. The above processing provides the haptic signal for producing the combined sensory effect as intended.

It is to be noted that step S48 combines the sets of vibration data at all vibration frequencies included in the content data, including the sets of vibration data at vibration frequencies of which the presentation timings do not overlap with each other.

In step S49, the signal processing section 23 supplies the vibration presentation section 41 with the haptic signal obtained in the processing of step S48 in order to perform the haptic presentation. That is, the vibration presentation section 41 carries out the haptic presentation with vibration stimulus by vibrating on the basis of the haptic signal supplied from the signal processing section 23.

Also, when there are other haptic data included in the content data supplied from the content processing section 25, such as temperature data and force data other than the vibration data, the signal processing section 23 generates haptic signals from the other haptic data. The signal processing section 23 sends the haptic signals thus generated to the temperature presentation section 42, the electrical stimulus presentation section 43, and the kinesthetic presentation section 44 to make these sections perform the haptic presentations.

Furthermore, in the case where audio data is included in the content data supplied from the content processing section 25, the signal processing section 23 generates an audio signal based on the audio data and supplies the generated audio signal to the audio presentation section 22 for audio presentation.

After the haptic and audio presentations are carried out as described above, the same-category combining process is terminated. This completes the processing of step S15 in FIG. 11, which brings the presentation process in FIG. 11 to an end.

In the above case, it has been stated that the sets of haptic data of which the presentation timings overlap with each other are vibration data. However, processing similar to the same-category combining process explained with reference to FIG. 12 is only required to be performed also in the case where the sets of haptic data whose presentation timings overlap with each other are temperature data or electrical stimulus data for electrical stimulation, or where there exist three or more sets of haptic data of which the presentation timings overlap with each other.

In the manner described above, when there are sets of haptic data of the same category of which the presentation timings overlap with each other, the vibration strength of each of the sets of haptic data is converted to a sensory strength. These sensory strengths are combined into a sensory strength. The resulting sensory strength is further converted to a vibration strength from which the haptic signal is generated. Further, in the case where the presentation time is prolonged, the information processing apparatus 11 adjusts the vibration strength in keeping with the sensory characteristics (sensitivity characteristics).

In this manner, presentation control is performed appropriately in consideration of the sensory characteristics even in the case where a plurality of haptic presentations is carried out simultaneously or where the presentation periods of a plurality of haptic presentations overlap with each other thereby prolonging the presentation time. This makes it possible to produce the sensory effects as initially intended.

<Explanation of the Strength Adjusting Process>

Figure 13:
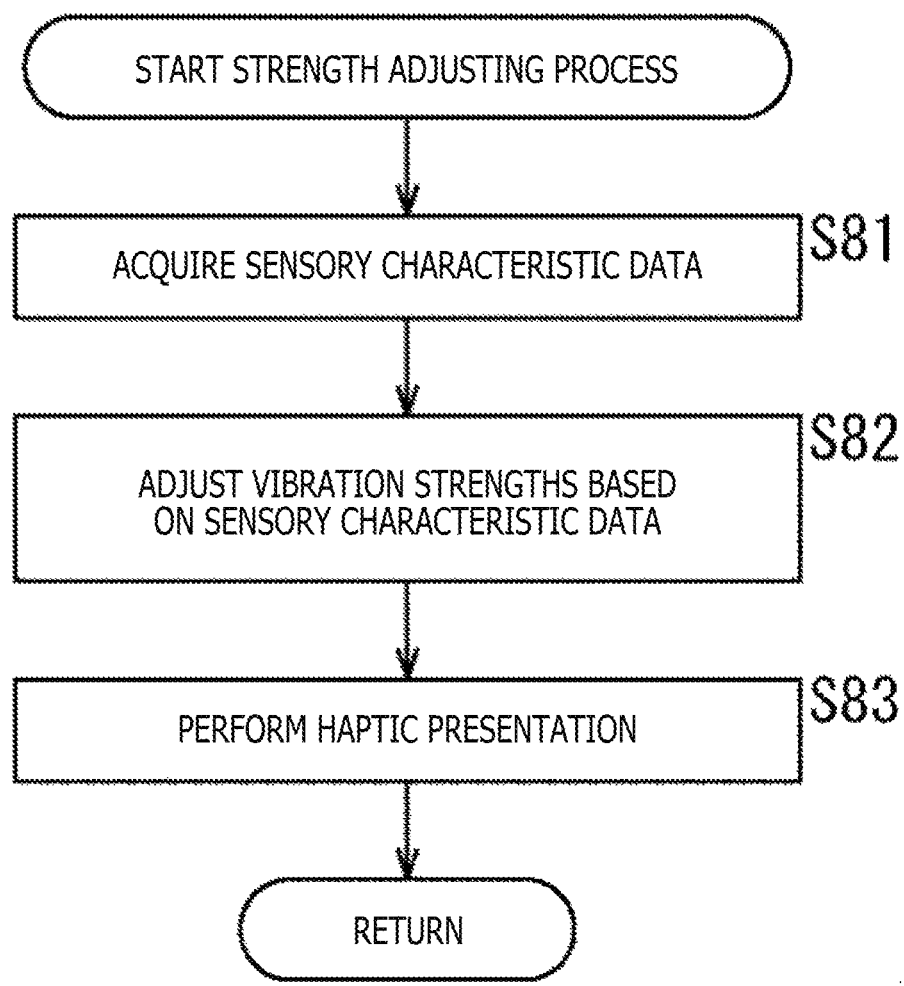
FIG. 13 is a flowchart explaining a strength adjusting process.

The strength adjusting process corresponding to the processing of step S16 in FIG. 11 is explained next with reference to the flowchart of FIG. 13. For the purpose of giving explanation specifically, the example to be explained hereunder involves two sets of data of which the presentation timings overlap with each other, one of the two sets of data being vibration data constituting haptic data.

In step S81, given the vibration frequency of sets of vibration data of which the presentation timings overlap with each other, the signal processing section 23 acquires from the storage section 24 the sensory characteristic data indicative of sensory characteristic relations between the stimulus based on other data whose presentation timing overlaps with that of the vibration data on one hand, and the vibration stimulus on the other hand.

For example, in the case where the presentation timing of the vibration stimulus based on the vibration data of a predetermined vibration frequency overlaps with the presentation timing of the temperature stimulus based on temperature data, what is acquired is the sensory characteristic data indicative of the amount of correction in the vibration data with respect to the temperature at each of different vibration frequencies depicted in FIG. 9.

At this point, in the case where the user's age and the user's body part corresponding to the presentation position of the haptic presentation with vibration stimulus can be identified by the signal supplied from the input section 26, for example, the signal processing section 23 acquires, for each of different vibration frequencies, the sensory characteristic data prepared for each of the ages and body parts identified of the user.

In step S82, the signal processing section 23 adjusts (corrects), for each of different vibration frequencies, the vibration strengths of sets of vibration data over a segment in which their presentation timings overlap with each other, thereby generating the haptic signal.

For example, in the case where the sets of data whose presentation timings overlap with each other are vibration data and temperature data, the signal processing section 23 corrects, on the basis of the sensory characteristic data depicted in FIG. 9, the vibration strength of the vibration data by the correction amount specified for the temperature indicated by the temperature data.

Also, the signal processing section 23 combines the sets of vibration data at all vibration frequencies included in the content data supplied from the content processing section 25, including the vibration data whose vibration strength has been corrected, thereby generating the haptic signal for vibration stimulus including these vibration frequency components. The above processing provides the haptic signal for producing the combined sensory effect as intended.

The above-described example involves using the sensory characteristic data indicative of the amount of correction in vibration data with respect to temperature for correcting the vibration data. Alternatively, the sensory characteristic data used for vibration data correction may be of any type, such as the sensory characteristic data indicative of the sensory strength of vibration stimulus with respect to temperature, i.e., any sensory characteristic data indicative of the relations between the strength (temperature) of both the haptic presentation with vibration stimulus and the haptic presentation with temperature stimulus being carried out simultaneously on one hand, and the sensory strength of the vibration stimulus on the other hand. For example, in the case where the sensory characteristic data indicative of the sensory strength of vibration stimulus with respect to temperature is used, the amount of correction in vibration data is obtained on the basis of the sensory characteristic data indicative of the sensory strength of vibration stimulus with respect to temperature. The vibration strength of the vibration data is then corrected by that correction amount.

Further in the above example, it has been stated that the sets of data whose presentation timings overlap with each other are vibration data and temperature data. However, similar processing is also performed in the case where the sets of data whose presentation timings overlap with each other are vibration data and audio data. That is, similar processing is carried out in the case where the sets of data of which the presentation timings overlap with each other are a combination of any two of the data types including vibration data, temperature data, audio data, electrical stimulus data, and force data.

For example, in the case where the sets of data whose presentation timings overlap with each other are vibration data and audio data, the sets of data indicative of the level of the sound for the above-mentioned audio presentation and the amount of correction in the vibration strength of the vibration stimulus with respect to that sound level are read out as the sensory characteristic data. In the case where the loudness of the sound for the audio presentation is equal to or higher than the threshold value th1 or is equal to or lower than the threshold value th2, the vibration strength of the vibration data is corrected on the basis of the sensory characteristic data.

In step S83, the signal processing section 23 supplies the haptic signal obtained in the processing of step S82 to the vibration presentation section 41 for performing the haptic presentation. That is, the vibration presentation section 41 vibrates on the basis of the haptic signal supplied from the signal processing section 23, thereby performing the haptic presentation with vibration stimulus.

Also, when there are sets of different haptic data other than the vibration data, such as temperature data and force data included in the content data supplied from the content processing section 25, the signal processing section 23 generates the haptic signal from these sets of haptic data and supplies the generated signal to the temperature presentation section 42, the electrical stimulus presentation section 43, and the kinesthetic presentation section 44 for performing the haptic presentations.

Further, in the case where audio data is included in the content data supplied from the content processing section 25, the signal processing section 23 generates the audio signal based on the audio data and supplies the generated audio signal to the audio presentation section 22 for performing the audio presentation.

After the haptic and audio presentations are carried out as described above, the strength adjusting process is terminated. This completes the processing of step S16 in FIG. 11, which brings the presentation process of FIG. 11 to an end.

In the manner described above, when there are sets of vibration data whose presentation timings overlap with each other as well as haptic data or audio data in a category different from that of the vibration data, the information processing apparatus 11 corrects the vibration strength of the vibration data on the basis of the sensory characteristic data.

In this manner, presentation control is performed appropriately in consideration of the sensory characteristics even in the case where a plurality of presentations is carried out simultaneously. This makes it possible to produce the sensory effects as initially intended.

When the presentation timing of the haptic presentation with vibration stimulus overlaps with the presentation timing of the haptic presentation with temperature stimulus, the strength adjusting process may be arranged to adjust (correct) the temperature based on the temperature data in consideration of the generation of heat by the vibration presentation section 41.

In such a case, a temperature sensor may be attached to the location of the vibration presentation section 41, for example, the temperature sensor being used to measure the temperature of the vibration presentation section 41. On the basis of temperature measurements from the temperature sensor, the signal processing section 23 adjusts the temperature given by the temperature data, i.e., adjusts the magnitude of the temperature data.

With the above examples, it has been specifically explained that the presentation position of the haptic presentation coincides with the placement position of the haptic presentation device. However, even in the case where a plurality of haptic presentation devices is used so that the haptic presentation is made to a presentation position different from the positions of these devices or where the presentation position of the haptic presentation is shifted over time, processing may still be performed in a manner similar to that of the case where the presentation position coincides with the placement position of the haptic presentation device. This also makes it possible to implement appropriate presentation control.

In other cases, such as where the present technology is applied to a haptic authoring tool for designing haptic signals, a switch can be made between two modes, one in which to express the sensory characteristics and sensory positions of humans, and the other in which to display engineering control information to be input directly to the haptic presentation device.

In the above case, when the mode in which to express the sensory characteristics and sensory positions of humans is selected with the haptic authoring tool, the presentation process described above is carried out.

On the other hand, when the mode in which to display engineering control information to be input directly to the haptic presentation device is selected and when sets of haptic data are combined, for example, these sets of haptic data are simply added up without regard to sensory characteristics to provide the final haptic data. That is, when sets of vibration data are combined as the haptic data to be presented simultaneously, their vibration strengths are added up. The vibration data with the vibration strength thus obtained by addition is regarded as the final vibration data.

At the time of combining sets of haptic data, there is a possibility that some danger, such as an excessively large stimulus brought about by the combined haptic data, may arise to the user or that the combined haptic data may lead to a haptic presentation device failure. In such a case, the signal processing section 23 may make arrangements to suppress the combination of the haptic data or to limit (change) the amplitude of the combined haptic data in order to ensure safety.

In this case, the signal processing section 23 may further supply the display section 27 with a message stating that there is a possibility of danger or failure or with a message to the effect that combining of such sets of haptic data is prohibited, the message being displayed on a GUI (Graphical User Interface) part.

Moreover, in order to prevent a low-temperature or high-temperature burn, the signal processing section 23 may determine continuously whether or not the amplitude of the haptic data falls within a safety-ensuring range in view of the consecutive presentation time of the haptic presentation, for example. In keeping with the result of the determination, the signal processing section 23 may generate the haptic signal.

<First Variation of the First Embodiment>
<Typical Configuration of the Information Processing System>

In the foregoing paragraphs, it has been explained that the information processing apparatus 11 is provided with all functions for performing the haptic and audio presentations. However, a plurality of apparatuses may operate in coordination with each other to carry out the haptic and audio presentations.

Figure 14:
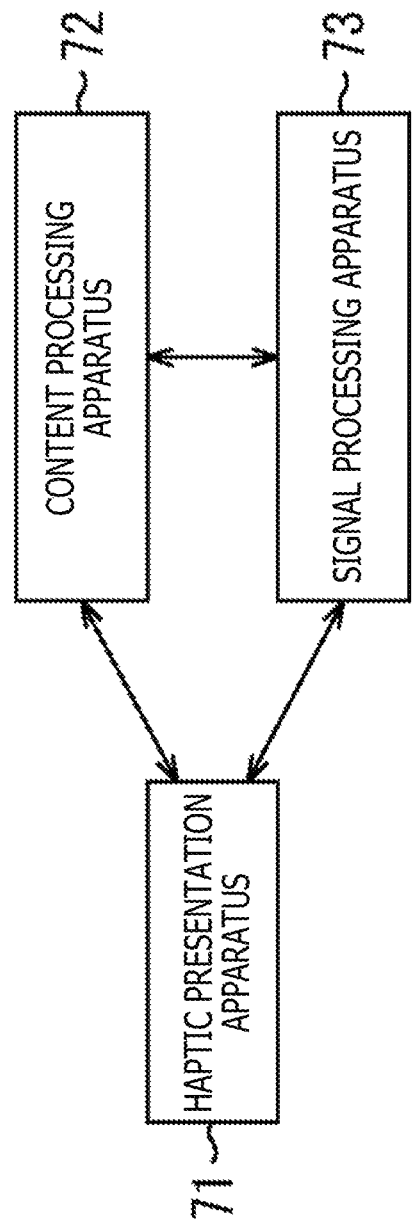
FIG. 14 is a view depicting a typical configuration of an information processing system.

In that case, an information processing system for performing the haptic and audio presentations is configured as illustrated in FIG. 14, for example. In the example in FIG. 14, the information processing system includes a haptic presentation apparatus 71, a content processing apparatus 72, and a signal processing apparatus 73.

In this example, the system constituents ranging from the haptic presentation apparatus 71 to the signal processing apparatus 73 communicate with each other to exchange various kinds of data therebetween via wired or wireless communication networks. The communication method for communication between the apparatus may be any suitable method.

The haptic presentation apparatus 71 includes, for example, the haptic presentation section 21, the audio presentation section 22, and the communication section 28 depicted in FIG. 10. The haptic presentation apparatus 71 performs haptic and audio presentations based on the haptic and audio signals received from the signal processing apparatus 73. In this case, the haptic presentation apparatus 71 corresponds to the vest (jacket) part of the haptic machine HM11 depicted in FIG. 1, for example.

Incidentally, the haptic presentation apparatus 71 need only be provided with at least the vibration presentation section 41 for performing haptic presentations with vibration stimulus and with the communication section 28. Any of the other sections including the temperature presentation section 42, the electrical stimulus presentation section 43, the kinesthetic presentation section 44, and the audio presentation section 22 may be provided in an apparatus or apparatuses apart from the haptic presentation apparatus 71.

The content processing apparatus 72 may be configured, for example, with a personal computer, a smartphone, a tablet, or a server. The content processing apparatus 72 includes the storage section 24 and the content processing section 25 depicted in FIG. 10, for example. The content processing apparatus 72 transmits to the signal processing apparatus 73 the content data and sensory characteristic data stored in the storage section 24.

The signal processing apparatus 73 is configured, for example, with a personal computer, a smartphone, a tablet, or a server. The signal processing apparatus 73 includes the signal processing section 23 depicted in FIG. 10, for example. The signal processing apparatus 73 generates haptic and audio signals on the basis of the content data and sensory characteristic data received from the content processing apparatus 72. The signal processing apparatus 73 transmits the generated haptic and audio signals to the haptic presentation apparatus 71. The content processing apparatus 72 and the signal processing apparatus 73 may be configured within a single apparatus. In this case, the apparatus having the content processing apparatus 72 and the signal processing apparatus 73 configured therein controls the operation of the haptic presentation apparatus 71 such as the jacket type machine connected by wire or wirelessly, causing the haptic presentation apparatus 71 to carry out the haptic and audio presentations.

<Other Typical External Configurations of the Haptic Machines>

Furthermore, as discussed above, the haptic machine corresponding to the information processing apparatus 11 may be of any type, as long as it performs haptic presentations to the user. For example, the information processing apparatus 11 may be a belt-type haptic machine HM21 worn around the waist of the user as illustrated in FIG. 15.

Figure 15:
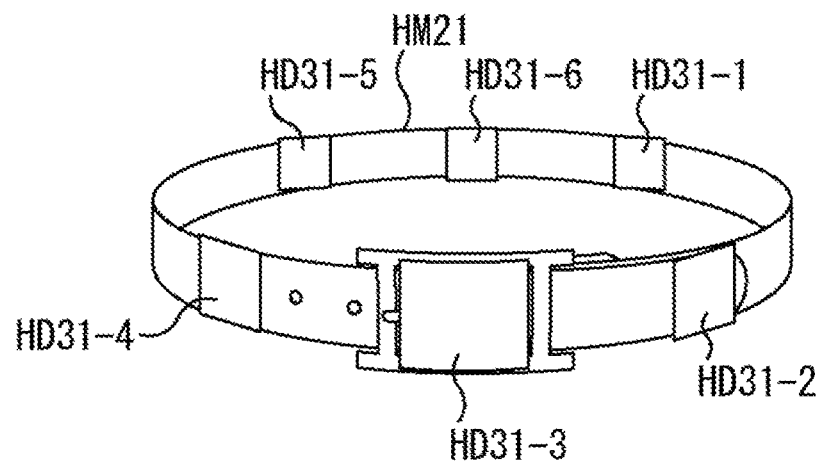
FIG. 15 is a view depicting a typical external configuration of another haptic machine.

The haptic machine HM21 in FIG. 15 is a belt-type device worn around the user's waist. The band portion of the belt making up the haptic machine HM21 is furnished with haptic presentation devices HD31-1 to HD31-6 arranged at approximately equal intervals to make contact with different parts of the user's waist wearing the haptic machine HM21.

The haptic presentation devices HD31-1 to HD31-6 are each constituted by a piezoelectric element actuator, for example. These devices perform haptic presentations with vibration stimulus to the user by vibrating on the basis of the supplied haptic signal.

For example, the haptic presentations carried out by the haptic machine HM21 present the user with the direction in which a target object is found and with the distance to that object.

Figure 16:
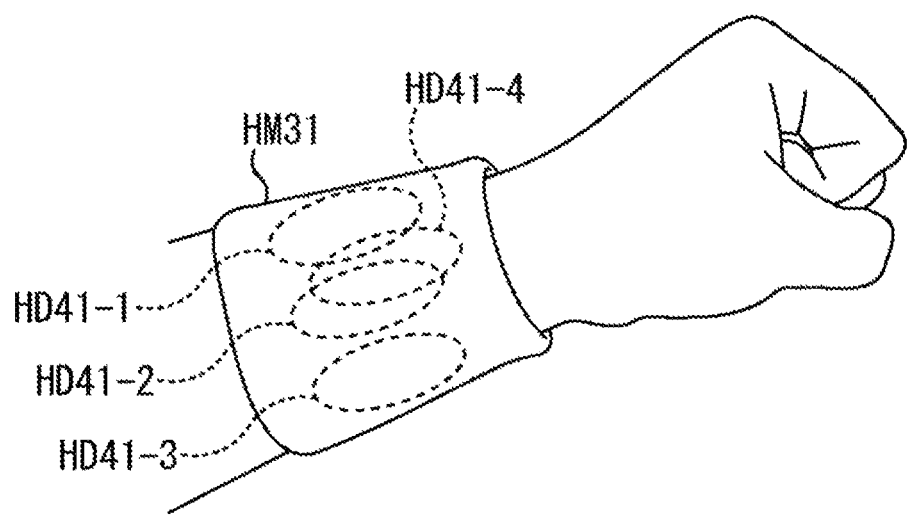
FIG. 16 is a view depicting a typical external configuration of another haptic machine.

As another example, the haptic machine corresponding to the information processing apparatus 11 may be a wristband-type haptic machine HM31 illustrated in FIG. 16.

In the example in FIG. 16, the haptic machine HM31 is worn around an arm portion near the user's wrist.

The haptic machine HM31 is a wristband-type device that has the function of presenting the user by haptic presentation with the direction in which the target object is found and with the distance to that target object.

The haptic machine HM31 is furnished with haptic presentation devices HD41-1 to HD41-4 that perform haptic presentations with vibration to the arm portion near the user's wrist.

The haptic presentation devices HD41-1 to HD41-4 are each constituted by a piezoelectric element actuator, for example. These devices perform haptic presentations with vibration stimulus to the user by vibrating on the basis of the supplied haptic signal.

Figure 17:
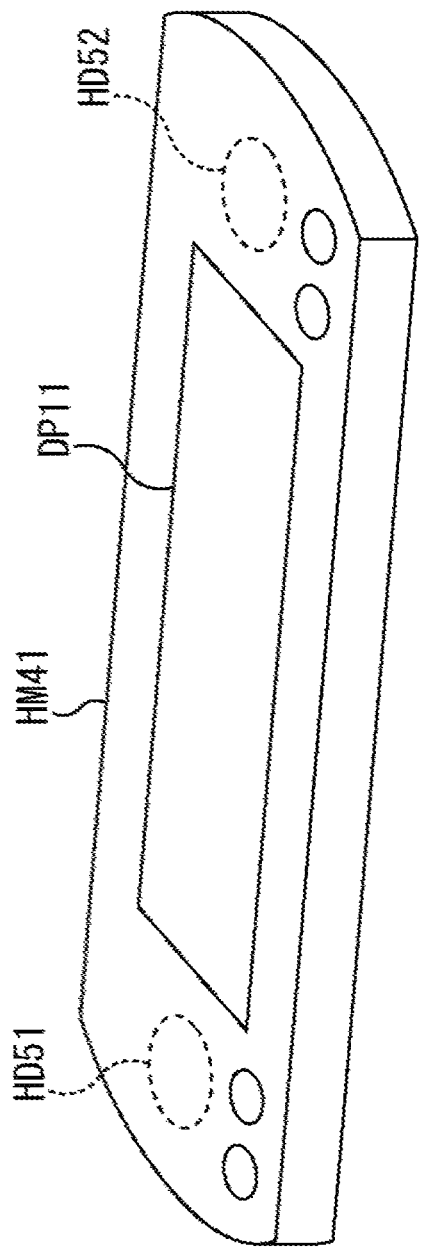
FIG. 17 is a view depicting a typical external configuration of another haptic machine.

As a further example, the haptic machine corresponding to the information processing apparatus 11 may be a portable device such as a game device illustrated in FIG. 17.

In the example in FIG. 17, a haptic machine HM41 is a portable device operated while being held by the user's hands. For example, the user holds both edges of the haptic machine HM41 by both hands and, while watching images appearing on a display part DP11 such as a liquid crystal display panel, plays games by manipulating the buttons on the haptic machine HM41.

The edge portions inside the haptic machine HM41 are provided with haptic presentation devices HD51 and HD52 for performing haptic presentations to the user in keeping with events taking place in the images appearing on the display part DP11.

The haptic presentation devices HD51 and HD52 are each constituted by a piezoelectric element actuator, for example. These devices perform haptic presentations with vibration stimulus to the user by vibrating on the basis of the supplied haptic signal. Alternatively, the haptic presentation devices in the examples in FIGS. 15 to 17 may obviously be replaced with other haptic presentation devices for performing haptic presentations using a stimulus of a category different from that of the vibration stimulus.

<Typical Configuration of the Computer>

The series of processes described above may be executed either by hardware or by software. In a case where the series of processes is to be carried out by software, the programs constituting the software are installed into a suitable computer. Variations of the computer include one with the software installed beforehand in its dedicated hardware, and a general-purpose personal computer or like equipment capable of executing diverse functions based on the programs installed therein.

FIG. 18 is a block diagram depicting a typical hardware configuration of a computer that executes the above-described series of processes using programs.

In the computer, a CPU (Central Processing Unit) 501, a ROM (Read Only Memory) 502, and a RAM (Random Access Memory) 503 are interconnected via a bus 504.

The bus 504 is further connected with an input/output interface 505. The input/output interface 505 is connected with an input section 506, an output section 507, a storage section 508, a communication section 509, and a drive 510.

The input section 506 typically includes a keyboard, a mouse, a microphone, and an imaging element. The output section 507 is formed with a haptic presentation device, a display, and speakers, for example. The storage section 508 generally includes a hard disk and a nonvolatile memory. The communication section 509 is typically constituted by a network interface. The drive 510 drives a removable recording medium 511 such as a magnetic disk, an optical disk, a magneto-optical disk, or a semiconductor memory.

In the computer configured as described above, the CPU 501 performs the above-mentioned series of processes by loading appropriate programs from the storage section 508 into the RAM 503 via the input/output interface 505 and the bus 504 and by executing the loaded programs.

The programs to be executed by the computer (i.e., CPU 501) may be provided as stored on the removable recording medium 511 constituting package media, for example. The programs may also be offered through wired or wireless communication media such as local area networks, the Internet, or digital satellite broadcasts.

When a suitable piece of the removable recording medium 511 carrying the relevant programs is attached to the drive 510, the programs are installed from the attached medium into the storage section 508 through the input/output interface 505. Alternatively, the programs may be received by the communication device 509 through wired or wireless transmission media before getting installed into the storage section 508. As another alternative, the programs may be preinstalled in the ROM 502 or in the storage section 508.

Also, each program to be executed by the computer may be processed chronologically in the sequence depicted in this description; in parallel with other programs, or in otherwise appropriately timed fashion such as when it is invoked as needed.

The present invention is not limited to the embodiments discussed above and may also be implemented in diverse variations without departing from the spirit and scope of the present technology.

For example, the present technology may be implemented as a cloud computing setup in which a single function is processed cooperatively by a plurality of networked apparatuses on a shared basis.

Also, each of the steps discussed with reference to the above-described flowcharts may be executed either by a single apparatus or by a plurality of apparatuses on a shared basis.

Furthermore, if a single step includes a plurality of processes, the plurality of processes may be executed either by a single apparatus or by a plurality of apparatuses on a shared basis.

The present disclosure may also be implemented preferably in the following configurations:

(1)
An information processing apparatus including:
a signal processing section configured such that in a case where a presentation timing of a first presentation with haptic sensation based on first data overlaps with a presentation timing of a second presentation with either haptic sensation or a sound based on second data, the signal processing section generates a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

(2)
The information processing apparatus according to (1), in which a presentation period of the first presentation and a presentation period of the second presentation overlap with each other at least partially.

(3)
The information processing apparatus according to (1) or (2), in which the signal processing section generates the haptic signal depending on whether or not the first presentation and the second presentation belong to the same category.

(4)
The information processing apparatus according to any one of (1) to (3), in which the first presentation and the second presentation involve the haptic sensation of the same category.

(5)
The information processing apparatus according to (4), in which
the sensory characteristic data indicates relations between a strength of a presentation performed with the haptic sensation and a sensory strength on the user from the presentation, and
the signal processing section obtains a sum of a sensory strength from the first presentation and a sensory strength from the second presentation as a combined sensory strength, and further generates a signal for performing a presentation with a strength to cause the combined sensory strength to be sensed, the signal serving as the haptic signal for performing the first presentation and the second presentation.

(6)
The information processing apparatus according to (4) or (5), in which
the sensory characteristic data indicates relations between presentation time of a presentation performed with the haptic sensation and a sensory strength on the user from the presentation, and
the signal processing section generates a signal of a strength reflecting the presentation time at a time of performing the first presentation and the second presentation, the signal serving as the haptic signal for performing the first presentation and the second presentation.

(7)
The information processing apparatus according to any one of (4) to (6), in which the first presentation and the second presentation include haptic presentations with vibration stimulus.

(8)
The information processing apparatus according to any one of (1) to (3), in which the first presentation and the second presentation belong to different categories.

(9)
The information processing apparatus according to (8), in which
the sensory characteristic data indicates relations between a strength of the second presentation at a time of simultaneously performing the first presentation and the second presentation and a sensory strength of the first presentation, and
the signal processing section corrects the haptic signal for performing the first presentation on the basis of the sensory characteristic data.

(10)
The information processing apparatus according to (8) or (9), in which the second presentation includes a presentation with haptic sensation.

(11)
The information processing apparatus according to (10), in which the first presentation includes a haptic presentation with vibration stimulus, and the second presentation includes a haptic presentation with temperature stimulus, electrical stimulus, kinesthetic stimulus, or pain stimulus.

(12)

The information processing apparatus according to (8) or (9), in which the first presentation includes a haptic presentation with vibration stimulus, and the second presentation includes a presentation with a sound.

(13)

The information processing apparatus according to any one of (1) to (12), in which the first presentation includes a haptic presentation with vibration stimulus, and the signal processing section generates the haptic signal on the basis of the sensory characteristic data at each of different vibration frequencies of the first presentation.

(14)

An information processing method including:

in a case where a presentation timing of a first presentation with haptic sensation based on first data overlaps with a presentation timing of a second presentation with either haptic sensation or a sound based on second data, generating a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

(15)

A program for causing a computer to execute a process including the step of:

in a case where a presentation timing of a first presentation with haptic sensation based on first data overlaps with a presentation timing of a second presentation with either haptic sensation or a sound based on second data, generating a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

REFERENCE SIGNS LIST

11 Information processing apparatus, 21 Haptic presentation section, 22 Audio presentation section, 23 Signal processing section, 25 Content processing section, 27 Display section, 28 Communication section

The invention claimed is:

1. An information processing apparatus comprising:
a signal processing section configured such that in a case where a presentation timing of a first presentation with haptic sensation based on first data overlaps with a presentation timing of a second presentation with either haptic sensation or a sound based on second data, the signal processing section generates a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

2. The information processing apparatus according to claim 1, wherein a presentation period of the first presentation and a presentation period of the second presentation overlap with each other at least partially.

3. The information processing apparatus according to claim 1, wherein the signal processing section generates the haptic signal depending on whether or not the first presentation and the second presentation belong to a same category.

4. The information processing apparatus according to claim 1, wherein the first presentation and the second presentation involve the haptic sensation of a same category.

5. The information processing apparatus according to claim 4, wherein
the sensory characteristic data indicates relations between a strength of a presentation performed with the haptic sensation and a sensory strength on the user from the presentation, and
the signal processing section obtains a sum of a sensory strength from the first presentation and a sensory strength from the second presentation as a combined sensory strength, and further generates a signal for performing a presentation with a strength to cause the combined sensory strength to be sensed, the signal serving as the haptic signal for performing the first presentation and the second presentation.

6. The information processing apparatus according to claim 4, wherein
the sensory characteristic data indicates relations between presentation time of a presentation performed with the haptic sensation and a sensory strength on the user from the presentation, and
the signal processing section generates a signal of a strength reflecting the presentation time at a time of performing the first presentation and the second presentation, the signal serving as the haptic signal for performing the first presentation and the second presentation.

7. The information processing apparatus according to claim 4, wherein the first presentation and the second presentation include haptic presentations with vibration stimulus.

8. The information processing apparatus according to claim 1, wherein the first presentation and the second presentation belong to different categories.

9. The information processing apparatus according to claim 8, wherein
the sensory characteristic data indicates relations between a strength of the second presentation at a time of simultaneously performing the first presentation and the second presentation and a sensory strength of the first presentation, and
the signal processing section corrects the haptic signal for performing the first presentation on a basis of the sensory characteristic data.

10. The information processing apparatus according to claim 8, wherein the second presentation includes a presentation with haptic sensation.

11. The information processing apparatus according to claim 10, wherein the first presentation includes a haptic presentation with vibration stimulus, and the second presentation includes a haptic presentation with temperature stimulus, electrical stimulus, kinesthetic stimulus, or pain stimulus.

12. The information processing apparatus according to claim 8, wherein the first presentation includes a haptic presentation with vibration stimulus, and the second presentation includes a presentation with a sound.

13. The information processing apparatus according to claim 1, wherein
the first presentation includes a haptic presentation with vibration stimulus, and
the signal processing section generates the haptic signal on a basis of the sensory characteristic data at each of different vibration frequencies of the first presentation.

14. An information processing method comprising:
in a case where a presentation timing of a first presentation with haptic sensation based on first data overlaps with a presentation timing of a second presentation with either haptic sensation or a sound based on second data, generating a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

15. A non-transitory computer-readable medium having embodied thereon a program, which when executed by a computer causes the computer to execute a method, the method comprising:
in a case where a presentation timing of a first presentation with haptic sensation based on first data overlaps with a presentation timing of a second presentation with either haptic sensation or a sound based on second data, generating a haptic signal for controlling a haptic presentation device performing at least the first presentation based on sensory characteristic data regarding the haptic sensation and on the first data in such a manner that a combined sensory effect on a user receiving both the first presentation and the second presentation becomes an effect merging a first sensory effect of the first presentation with a second sensory effect of the second presentation.

* * * * *